United States Patent
Billot et al.

(10) Patent No.: US 12,528,768 B2
(45) Date of Patent: Jan. 20, 2026

(54) CRYSTALLINE FORM OF A 7H-BENZO[7]ANNULENE-2-CARBOXYLIC ACID DERIVATIVE

(71) Applicant: Sanofi, Paris (FR)

(72) Inventors: Pascal Billot, Paris (FR); Benoît Robert, Paris (FR)

(73) Assignee: Sanofi, Paris (FR)

( * ) Notice: Subject to any disclaimer, the term of this patent is extended or adjusted under 35 U.S.C. 154(b) by 896 days.

(21) Appl. No.: 17/783,364

(22) PCT Filed: Dec. 8, 2020

(86) PCT No.: PCT/EP2020/085011
§ 371 (c)(1),
(2) Date: Jun. 8, 2022

(87) PCT Pub. No.: WO2021/116074
PCT Pub. Date: Jun. 17, 2021

(65) Prior Publication Data
US 2023/0028566 A1   Jan. 26, 2023

(30) Foreign Application Priority Data

Dec. 9, 2019   (EP) ..................................... 19306599

(51) Int. Cl.
*C07D 207/12*   (2006.01)
*A61K 31/4015*   (2006.01)
*A61P 35/00*   (2006.01)

(52) U.S. Cl.
CPC ........ *C07D 207/12* (2013.01); *A61K 31/4015* (2013.01); *A61P 35/00* (2018.01); *C07B 2200/13* (2013.01)

(58) Field of Classification Search
None
See application file for complete search history.

(56) References Cited

U.S. PATENT DOCUMENTS

| | | |
|---|---|---|
| 6,495,607 B2 | 12/2002 | Bohlmann et al. |
| 7,429,681 B2 | 9/2008 | Pinney et al. |
| 7,612,114 B2 | 11/2009 | Hamaoka et al. |
| 7,799,824 B2 | 9/2010 | Lagu et al. |
| 8,299,112 B2 | 10/2012 | Smith et al. |
| 9,309,211 B2 | 4/2016 | Xiao et al. |
| 9,540,361 B2 | 1/2017 | Dijcks et al. |
| 9,714,221 B1 | 7/2017 | Bouaboula et al. |
| 9,845,291 B2 | 12/2017 | Liang et al. |
| 10,570,090 B2 | 2/2020 | Bouaboula et al. |
| 10,966,963 B2 | 4/2021 | Labadie et al. |
| 11,149,031 B2 | 10/2021 | Bouaboula et al. |
| 11,214,541 B2 | 1/2022 | Bouaboula et al. |
| 11,260,057 B2 | 3/2022 | Bouaboula et al. |
| 11,713,296 B2 | 8/2023 | Malpart et al. |
| 12,157,721 B2 | 12/2024 | Rabion et al. |
| 2012/0130219 A1 | 5/2012 | Zhao et al. |
| 2013/0252890 A1 | 9/2013 | Wintermantel et al. |
| 2015/0080438 A1 | 3/2015 | Wintermantel et al. |
| 2015/0157606 A1 | 6/2015 | Maneval et al. |
| 2016/0184311 A1 | 6/2016 | Chen et al. |
| 2017/0197915 A9 | 7/2017 | Liang et al. |
| 2017/0233340 A1 | 8/2017 | Bouaboula et al. |

(Continued)

FOREIGN PATENT DOCUMENTS

| | | |
|---|---|---|
| CN | 1309635 A | 8/2001 |
| CN | 106924210 A | 7/2017 |
| CN | 109896991 A | 6/2019 |
| EA | 023947 B1 | 7/2016 |

(Continued)

OTHER PUBLICATIONS

Bouaboula, M. et al., Pending U.S. Appl. No. 18/037,949, filed May 19, 2023.

(Continued)

*Primary Examiner* — Juliet C Switzer
*Assistant Examiner* — Dawanna Shar-Day White
(74) *Attorney, Agent, or Firm* — McNeill PLLC

(57) ABSTRACT

The present disclosure relates to a compound of formula (1) as an anhydrate which is in a crystalline Form 2, characterized by having a powder-X-ray diffractogram displaying peaks expressed as degree 2-Theta angles at about 9.5; 11.8; 14.1; 14.6; 17.7 and 18.5 and a solid form thereof. The present disclosure also relates to processes for its preparation, as well as a medicament and a pharmaceutical composition comprising it. The present disclosure further concerns the anhydrate crystalline Form 2 of compound of formula (1) for use as a medicine and more particularly in the treatment of cancer.

21 Claims, 24 Drawing Sheets

(56) References Cited

U.S. PATENT DOCUMENTS

| | | |
|---|---|---|
| 2018/0153828 A1 | 6/2018 | Garner et al. |
| 2019/0167652 A1 | 6/2019 | Abrams et al. |
| 2020/0155521 A1 | 5/2020 | Schwartz et al. |
| 2020/0352905 A1 | 11/2020 | Cartot-Cotton et al. |
| 2020/0361918 A1 | 11/2020 | Bouaboula et al. |
| 2020/0392081 A1 | 12/2020 | Bouaboula et al. |
| 2021/0188771 A1 | 6/2021 | Rabion et al. |
| 2021/0188772 A1 | 6/2021 | Malpart et al. |
| 2022/0073460 A1 | 3/2022 | Bouaboula et al. |
| 2022/0204488 A1 | 6/2022 | Bouaboula et al. |
| 2022/0362248 A1 | 11/2022 | Bouaboula et al. |
| 2023/0089371 A1 | 3/2023 | Bouaboula et al. |
| 2023/0115865 A1 | 4/2023 | Boisnard et al. |
| 2023/0382854 A1 | 11/2023 | Bernardelli et al. |
| 2023/0404971 A1 | 12/2023 | Bouaboula et al. |
| 2024/0091194 A1 | 3/2024 | Cartot-Cotton et al. |
| 2024/0101512 A1 | 3/2024 | Bernardelli et al. |
| 2024/0197692 A1 | 6/2024 | Bouaboula et al. |
| 2024/0197739 A1 | 6/2024 | Bouaboula et al. |
| 2025/0042849 A1 | 2/2025 | Rabion et al. |

FOREIGN PATENT DOCUMENTS

| | | |
|---|---|---|
| EP | 1229036 B1 | 1/2005 |
| EP | 3434272 A1 | 1/2019 |
| JP | 2002520388 A | 7/2002 |
| JP | 2005528320 A | 9/2005 |
| JP | 2008512348 A | 4/2008 |
| JP | 2008546706 A | 12/2008 |
| JP | 2011500538 A | 1/2011 |
| JP | 2013530973 A | 8/2013 |
| JP | 2015500814 A | 1/2015 |
| JP | 2018537406 A | 12/2018 |
| WO | 1992015579 A1 | 9/1992 |
| WO | 0003979 A1 | 1/2000 |
| WO | 2003016270 A2 | 2/2003 |
| WO | 2003091239 A1 | 11/2003 |
| WO | 2004058682 A1 | 7/2004 |
| WO | 2006012135 A1 | 2/2006 |
| WO | 2006138427 A2 | 12/2006 |
| WO | 2009047343 A1 | 4/2009 |
| WO | 2009101634 A2 | 8/2009 |
| WO | 2012037410 A2 | 3/2012 |
| WO | 2012037411 A2 | 3/2012 |
| WO | 2012068284 A2 | 5/2012 |
| WO | 2013097773 A1 | 7/2013 |
| WO | 2015028409 A1 | 3/2015 |
| WO | 2016051374 A1 | 4/2016 |
| WO | 2016097071 A1 | 6/2016 |
| WO | 2016097072 A1 | 6/2016 |
| WO | 2016176666 A1 | 11/2016 |
| WO | 2017140669 A1 | 8/2017 |
| WO | 2018091153 A1 | 5/2018 |
| WO | 2019020559 A1 | 1/2019 |
| WO | 2019106604 A1 | 6/2019 |
| WO | 2019144132 A1 | 7/2019 |
| WO | 2020014435 A1 | 1/2020 |
| WO | 2020049153 A1 | 3/2020 |
| WO | 2020112765 A1 | 6/2020 |
| WO | 2020225375 A1 | 11/2020 |
| WO | 2021127043 A1 | 6/2021 |
| WO | 2021170793 A1 | 9/2021 |
| WO | 2021178846 A1 | 9/2021 |
| WO | 2022084280 A1 | 4/2022 |
| WO | 2022084298 A1 | 4/2022 |
| WO | 2022106711 A1 | 5/2022 |
| WO | 2022218956 A1 | 10/2022 |
| WO | 2022218958 A1 | 10/2022 |

OTHER PUBLICATIONS

Cancer [online]—Medline Plus, [Retrieved on Jul. 6, 2007] Retrieved from the Internet, URL: http://www.nlm.nih.gov/medlineplus/cancer.html, pp. 1-10.

Anonymous, "Phase 1 / 2 Study of Amcenestrant (SAR439859) Single Agent and in Combination With Other Anti-cancer Therapies in Postmenopausal Women With Estrogen Receptor Positive Advanced Breast Cancer," Sep. 15, 2017, URL: https://www.clinicaltrials.gov/ct2/show/NCT03284957.

Besret, et al., "Translational strategy using multiple nuclear imaging biomarkers to evaluate target engagement and early therapeutic efficacy of SAR439859, a novel selective estrogen receptor degrader", Ejnmmi Research, Biomed Central Ltd, London, UK, vol. 10, No. 1, Jun. 29, 2020, pp. 1-13.

Bouaboula, M., et al., Pending U.S. Appl. No. 18/286,496, filed Oct. 11, 2023.

Bouaboula, M., et al., Pending U.S. Appl. No. 18/286,510, filed Oct. 11, 2023.

International Search Report for International Application No. PCT/EP2022/059700, mailed Jul. 8, 2022.

International Search Report for International Application No. PCT/EP2022/059704, mailed Jul. 21, 2022.

Robinson, Dan, R. et al., "Activating ESR1 mutations in hormone-resistant metastatic breast cancer", Nat. Genet., Dec. 2013, 45(12), 1446-1451.

Toy, Weiyi, et al., "Activating ESR1 mutations differentially impact the efficacy of ER antagonists", Cancer Discovery, Mar. 2017, 7(3), 277-287.

Bernardelli, P., et al., Pending U.S. Appl. No. 18/032,500, filed Apr. 18, 2023.

Bernardelli, P., et al., Pending U.S. Appl. No. 18/032,502, filed Apr. 18, 2023.

Chandarlapaty, S., et al., "277MO SAR439859, an oral selective estrogen receptor (ER) degrader (SERD), in ER+ HER2-metastatic breast cancer (mBC): Biomarker analyses from a phase I/II study", Annals of Oncology, vol. 31, No. S4, Sep. 1, 2020, p. S351.

International Search Report for International Application No. PCT/EP2021/078883, mailed Dec. 9, 2021.

International Search Report for International Application No. PCT/EP2021/078916, mailed Dec. 9, 2021.

International Search Report for International Application No. PCT/EP2021/082583, mailed Feb. 25, 2022.

Anstead, Gregory M. et al., "2,3-Diarylindenes and 2,3-Diarylindenones: Synthesis, Molecular Structure, Photochemistry, Estrogen Receptor Binding Activity, and Comparisons with Related Triarylethylenes", Journal of Medicinal Chemistry, vol. 31, No. 7, pp. 1316-1326 (1988).

Bardia, A., et al., Dose-escalation study of SAR439859, an oral selective estrogen receptor (ER) degrader (SERD), in postmenopausal women with ER+/HER2-metastatic breast cancer (mBC), Journal of Clinical Oncology, vol. 37, Suppl. 15, p. 1054 (May 20, 2019).

Boinsard, S., et al., Pending U.S. Appl. No. 17/765,169, filed Mar. 30, 2022.

Bouaboula, M. et al., U.S. Appl. No. 16/414,558, filed May 16, 2019 (Issued).

Bouaboula, M., et al., Pending U.S. Appl. No. 17/460,629, filed Aug. 30, 2021.

Bouaboula, M., et al., Pending U.S. Appl. No. 17/532,051, filed Nov. 22, 2021.

Bouaboula, M., et al., U.S. Appl. No. 16/743,504, filed Jan. 15, 2020 (Abandoned).

Campone, M., et al., "Abstract P5-11-02: Dose-escalation study of SAR439859, an oral selective estrogen receptor degrader, in postmenopausal women with estrogen receptor-positive and human epidermal growth factor receptor 2-negative metastatic breast cancer," Cancer Research, vol. 80, Suppl. 4, pp. 1-4 (Feb. 2020).

Cartot-Cotton, S., et al., Pending U.S. Appl. No. 16/870,031, filed May 8, 2020.

Deroo, B.J., et al., "Estrogen Receptors and Human Disease", The Journal of Clinical Investigation, vol. 116, No. 3, pp. 561-570 (2006).

El-Ahmad, Y., et al., "Discovery of 6-(2,4-Dichlorophenyl)-5-[4-[(3S)-1-(3-fluoropropyl)-pyrrolidin-3-yl]-oxyphenyl]-8,9-dihydro-7H-benzo[7]annulene-2-carboxylic acid (SAR439859), a Potent and Selective Estrogen Receptor Degrader (SERD) for the Treat-

(56) References Cited

OTHER PUBLICATIONS ment of Estrogen-Receptor-Positive Breast Cancer," Journal of Medicinal Chemistry, vol. 63, No. 2, pp. 512-528 (2019).
Extended European Search Report issued in European Application No. 19305593.6 on Oct. 30, 2019, 7 pages.
Franks, et al., "Selective Estrogen Receptor Modulators: Cannabinoid Receptor Inverse Agonists with Differential CB1 and CB2 Selectively," Frontiers inPharmacology, vol. 7, No. 503, pp. 1-16 (2016).
Golub et al., "Molecular Classification of Cancer: Class Discovery and Class Prediction by Gene Expression Monitoring", Science, vol. 286, pp. 531-537 (1999).
Gould, P., "Salt selection for basic drugs," International Journal of Pharmaceutics, vol. 33, pp. 201-217 (1986).
International Search Report for PCT/EP2017/053282, mailed Jul. 6, 2017.
International Search Report for PCT/EP2017/068446, mailed Sep. 12, 2017.
International Search Report for PCT/EP2018/069901, mailed Oct. 12, 2018.
International Search Report for PCT/EP2019/073823, mailed Oct. 10, 2019.
International Search Report for PCT/EP2019/073827, mailed Oct. 9, 2019.
International Search Report for PCT/EP2020/062743, mailed Aug. 10, 2020.
International Search Report for PCT/EP2020/085011, mailed Jan. 25, 2021.
Jordan, Craig V., "Antiestrogens and Selective Estrogen Receptor Modulators as Multifunctional Medicines. 1. Receptor Interactions," Journal of Medicinal Chemistry, vol. 46, No. 6, pp. 883-908 (2003).
Lala, P.K., et al., "Role of Nitric Oxide in Tumor Progression: Lessons From Experimental Tumors", Cancer Metastasis Reviews, Mar. 1998, vol. 17, No. 1, pp. 91-106.
Malpart, J., et al., Pending U.S. Appl. No. 17/193,776, filed Mar. 5, 2021.
McCague, Raymond et al., "Nonisomerizable Analogues of (Z)- and (E)-4-Hydroxytamoxifen. Synthesis and Endocrinological Properties of Substituted Diphenylbenzocycloheptenes", Journal of Medicinal Chemistry, vol. 31, No. 7, pp. 1285-1290 (1988).
Miller, Chris P., "SERMs: Evolutionary Chemistry, Revolutionary Biology," Current Pharmaceutical Design, vol. 8, No. 23, pp. 2089-2111 (2002).
Pickar, et al., "SERMs: Progress and future perspectives," Maturitas, Elsevier, vol. 67, pp. 129-138 (2010).
Rabion, A., et al., Pending U.S. Appl. No. 17/193,706, filed Mar. 5, 2021.
Ruff, et al., "Estrogen Receptor Transcription and Transactivation Structure-Function Relationship in DNA- and Ligand-Binding Domains of Estrogen Receptors", Breast Cancer Research, 2000, vol. 2, No. 5, pp. 353-359.
Translation of Office Action issued in Japanese Application No. 2018-515615, mailed on Sep. 18, 2018, 3 pages.
Translation of Search Report issued in Chinese Application No. 201780023008.0, mailed Apr. 23, 2020, 3 pages.
Ullrich, et al., "Estrogen receptor modulator review," Expert Opinion, vol. 16, No. 5, pp. 559-572 (2006).
Ashizawa, Kazuhide, "Optimization of salt and crystalline forms, and crystallization techniques," Pharm Tech Japan, 2002, vol. 18, No. 10, pp. 81-96 (machine translation of excerpts).
Hirayama, Noriaki, "Handbook for organic compounds crystal preparation," 2008, pp. 17-23, 37-40, 45-51, 57-65 (machine translation of excerpts).
Rabion, A., et al., Pending U.S. Appl. No. 18/924,400, filed Oct. 23, 2024.
Bouaboula, M., et al., Pending U.S. Appl. No. 17/802,223, filed Aug. 25, 2022.
International Search Report for International Application No. PCT/EP2021/054815, mailed May 12, 2021.
Mannava, M.K.C., et al., "Enhanced Bioavailability in the Oxalate Salt of the Antituberculosis Drug Ethionamide," Crystal Growth & Design, vol. 16(3), pp. 1591-1598, (2016).
RN 1861739-57-2, Registry Database Compound, 2016.
André, F., et al., Alpelisib for PIK3CA-Mutated, Hormone Receptor-Positive Advanced Breast Cancer, The New England Journal of Medicine, vol. 380, No. 20, May 16, 2019, 12 pages (1929-1940).
Bouaboula, M., et al., Pending U.S. Appl. No. 17/579,187, filed Jan. 19, 2022.
Littke, A.F., et al., "Versatile Catalysts for the Suzuki Cross-Coupling of Arylboronic Acids with Aryl and Vinyl Halides and Triflates under Mild Conditions," Journal of the American Chemical Society, 122(17): 4020-4028 (2000).
Bouaboula, M., et al., U.S. Appl. No. 17/124,852, filed Dec. 17, 2020. (Issued).
Bouaboula, M., et al., Pending U.S. Appl. No. 16/634,089, filed Jan. 24, 2020. (Issued).

CRYSTALLINE FORM OF A 7H-BENZO[7]ANNULENE-2-CARBOXYLIC ACID DERIVATIVE

CROSS-REFERENCE TO RELATED APPLICATIONS

This application is a national phase entry pursuant to 35 U.S.C. § 371 of International Application No. PCT/EP2020/085011, filed Dec. 8, 2020, which claims the benefit of priority to European Application No. 19306599.2, filed Dec. 9, 2019, the contents of each of which are incorporated by reference herein in their entirety for any purpose.

Herein is provided 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid (hereafter designated as compound of formula (1)) as an anhydrate which is in a crystalline Form 2. Herein are also provided processes for its preparation, and this anhydrate crystalline Form 2 for use as a medicine, and particularly in the treatment of cancer.

Compound of formula (1), depicted below, is a selective estrogen receptor degrader (SERD) which has estrogen receptor antagonist properties and accelerates the proteasomal degradation of the estrogen receptor. It may be used in particular as anticancer agent. This compound, in amorphous form, is disclosed in the application WO2017/140669.

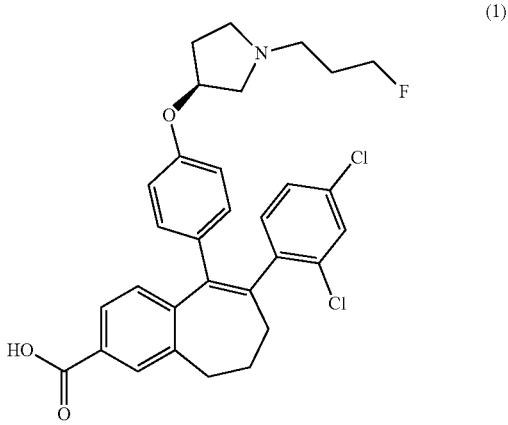 [SMILES: O=C(O)c1ccc2c(c1)CCCC(c1ccc(Cl)cc1Cl)=C2c1ccc(O[C@H]2CCN(CCCF)C2)cc1]

(1)

Besides its pharmaceutical efficacy, a pharmaceutically active agent has to comply with a variety of additional requirements. For instance, its stability under various environmental conditions, its stability during production of the pharmaceutical formulation or its stability in the final medicament compositions. In addition, when a pharmaceutically active agent is used to prepare a pharmaceutical composition, it should be as pure as possible and its stability in long-term storage must be guaranteed under various environmental conditions. For example, this reduces or avoids the risk that the content of active substance in the medicament be less than that specified.

Typically, in amorphous form, the compound of formula (1) is not optimal for handling at industrial scale as it needs storage under refrigerated conditions to maintain its stability over time.

Hence, there is a need to provide the compound of formula (1) under a form which is the most thermodynamically stable form at least under ambient conditions of temperature and pressure and which allows its use and storage at an industrial scale.

Furthermore, a pharmaceutically active agent should be only slightly hygroscopic. Indeed, the absorption of moisture decreases the amount of pharmaceutically active agent as a result of the increased weight caused by the uptake of water. Generally, pharmaceutical compositions that tend to absorb moisture have to be protected from moisture during storage, for example by adding suitable drying agents or by storing the drug in an environment where it is protected from moisture.

There is also a need to provide the compound of formula (1) in a form which displays low hygroscopicity and does not require to add drying agents or to impose drastic conditions for storage.

Further, the availability of a well-defined crystalline form allows the purification of the drug substance by recrystallization.

The disclosure relates to a stable crystalline form of the compound of formula (1) which meets the important above-mentioned features.

Herein is provided a novel 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid as an anhydrate which is in a crystalline Form 2, characterized by having a powder-X-ray diffractogram displaying peaks expressed as degree 2-Theta angles at about 9.5; 11.8; 14.1; 14.6; 17.7 and 18.5 (each time ±0.2), which optionally further shows the following peaks expressed as degree 2-Theta angles at about: 15.5; 15.9; 16.6 and 22.2 (each time ±0.2), optionally further characterized by a powder X-ray diffractogram as substantially illustrated in FIG. 1.

Herein is also provided a solid form, which is anhydrate crystalline Form 2 of the compound of formula (1).

Herein are further provided processes for the preparation of the anhydrate crystalline Form 2 of compound of formula (1).

Herein are also provided medicaments comprising the anhydrate crystalline Form 2 of compound of formula (1), and pharmaceutical compositions comprising the anhydrate crystalline Form 2 of compound of formula (1) and at least one pharmaceutically acceptable excipient.

In a particular embodiment, in said pharmaceutical composition, said anhydrate crystalline form 2 is substantially pure and substantially free of alternative forms.

In another particular embodiment, in said pharmaceutical composition, said anhydrate crystalline form 2 is at least 90 percent by weight of all forms.

As used herein, the term "substantially pure" means that the crystalline form contains at least 90 percent, preferably at least 95 percent, more preferably at least 97 percent, and most preferably at least 99 percent by weight of the indicated crystalline form. Alternatively, it will be understood that "substantially pure" means that the crystalline form contains less than 10 percent, preferably less than 5 percent, more preferably less than 3 percent, and most preferably less than 1 percent by weight of impurities, including other polymorphic, solvated or amorphous forms.

Herein are further disclosed the anhydrate crystalline Form 2 of compound of formula (1) for use as a medicine, for use as an inhibitor and degrader of estrogen receptors, and for use in the treatment of various diseases wherein estrogen receptors are involved, more particularly cancer.

Herein is further disclosed use of the anhydrate crystalline Form 2 of compound of formula (1) for the manufacture of a medicament for treating a disease involving inhibition and degradation of estrogen receptors.

Herein is further disclosed use of the anhydrate crystalline Form 2 of compound of formula (1) for the manufacture of a medicament for treating cancer.

Herein is further disclosed method of treating a disease involving inhibition and degradation of estrogen receptors, comprising administering to a subject in need thereof a therapeutically effective amount of the anhydrate crystalline Form 2 of compound of formula (1).

Herein is further disclosed method of treating cancer, comprising administering to a subject in need thereof, in particular a human, a therapeutically effective amount of the anhydrate crystalline Form 2 of compound of formula (1).

As used herein, the term "ambient temperature" or "room temperature" refers to a temperature ranging from 18° C. to 25° C. unless differently specified.

(a) under acetone vapor (solid line), and (b) after exposure to nitrogen (bold line) measured at room temperature.

Figure 15A:
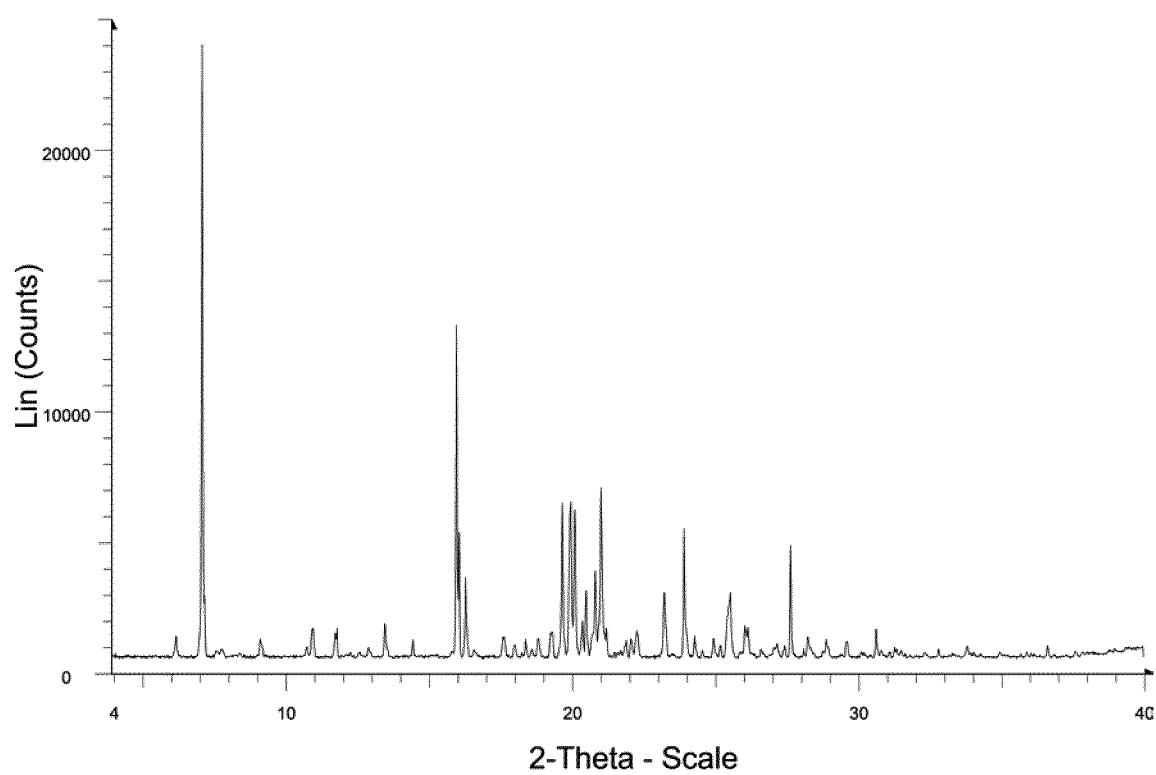

FIG. 15a is a X-ray powder diagram of butanol solvate of compound of formula (1) under butanol vapor measured at room temperature.

Figure 15B:
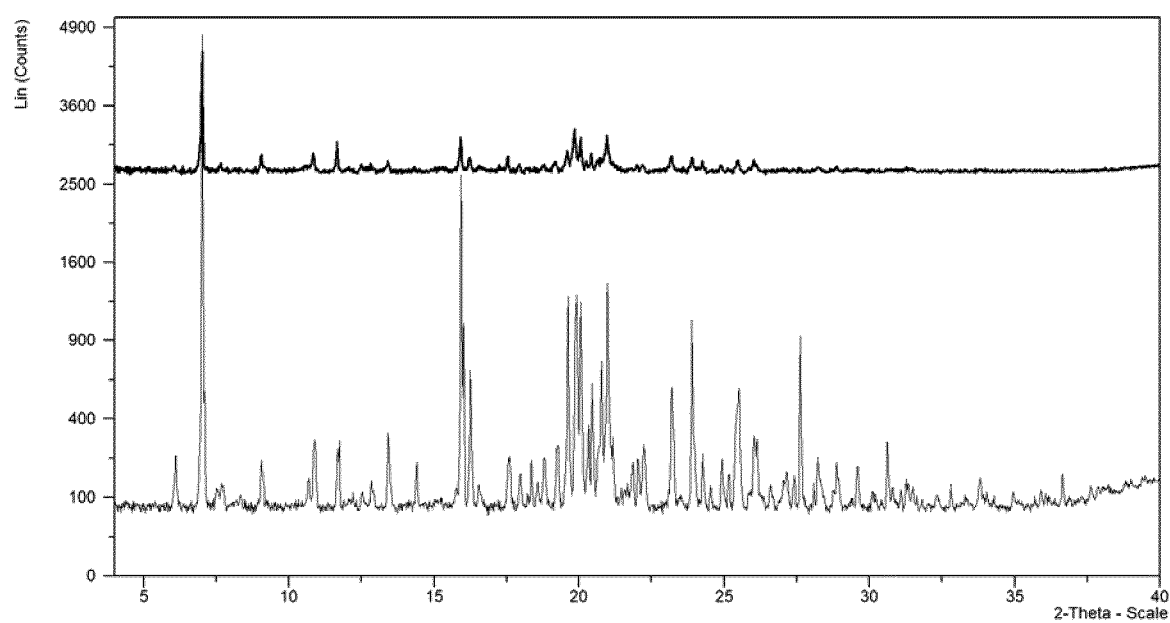

FIG. 15b is a X-ray powder diagram which comprises two X-ray powder diagrams of butanol solvate of compound of formula (1) respectively from bottom to top: (a) under butanol vapor (solid line), and (b) after exposure to ambient conditions (bold line) measured at room temperature.

Figure 16:
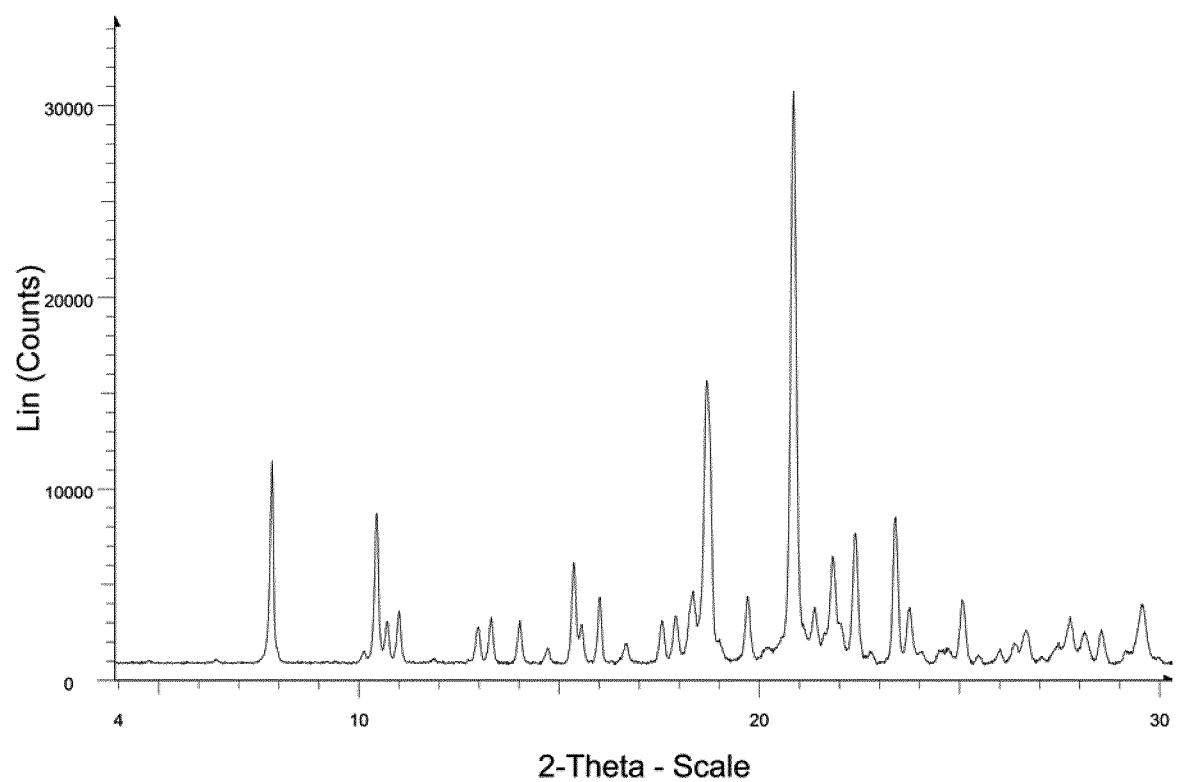

FIG. 16 is a X-ray powder diagram of DCM solvate of compound of formula (1) under DCM vapor measured at room temperature.

Figure 17:
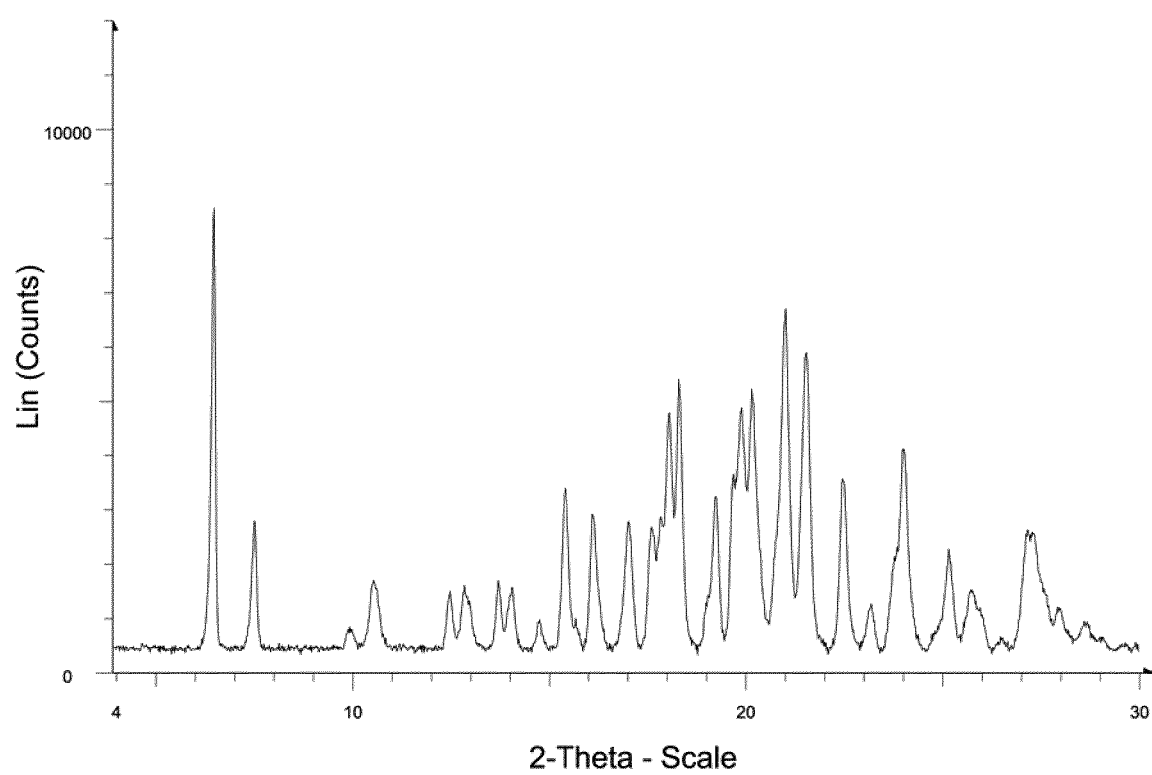

FIG. 17 is a X-ray powder diagram of THF solvate of compound of formula (1) under THF vapor measured at room temperature.

Figure 18:
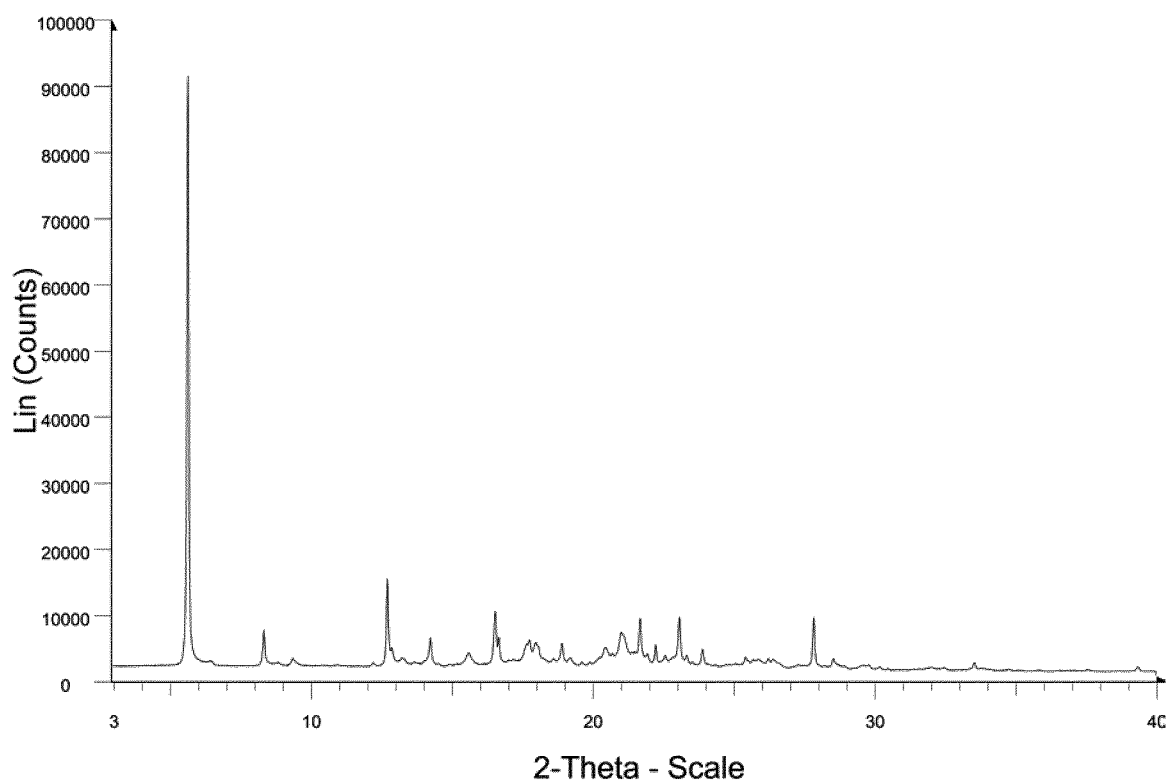

FIG. 18 is a HR (high resolution) X-ray powder diagram of 2-propanol solvate of compound of formula (1) measured at room temperature.

Figure 19:
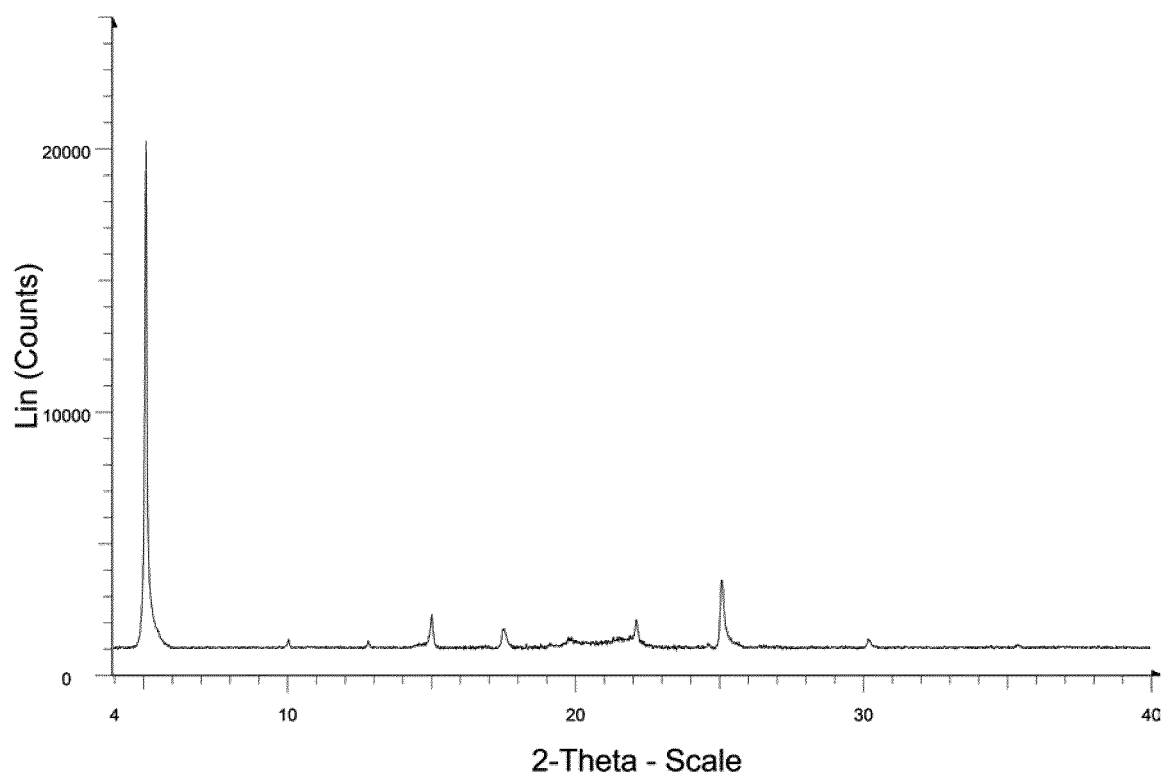

FIG. 19 is a X-ray powder diagram of methyl tert-butyl ether (MTBE) solvate of compound of formula (1) measured at room temperature.

Figure 20A:
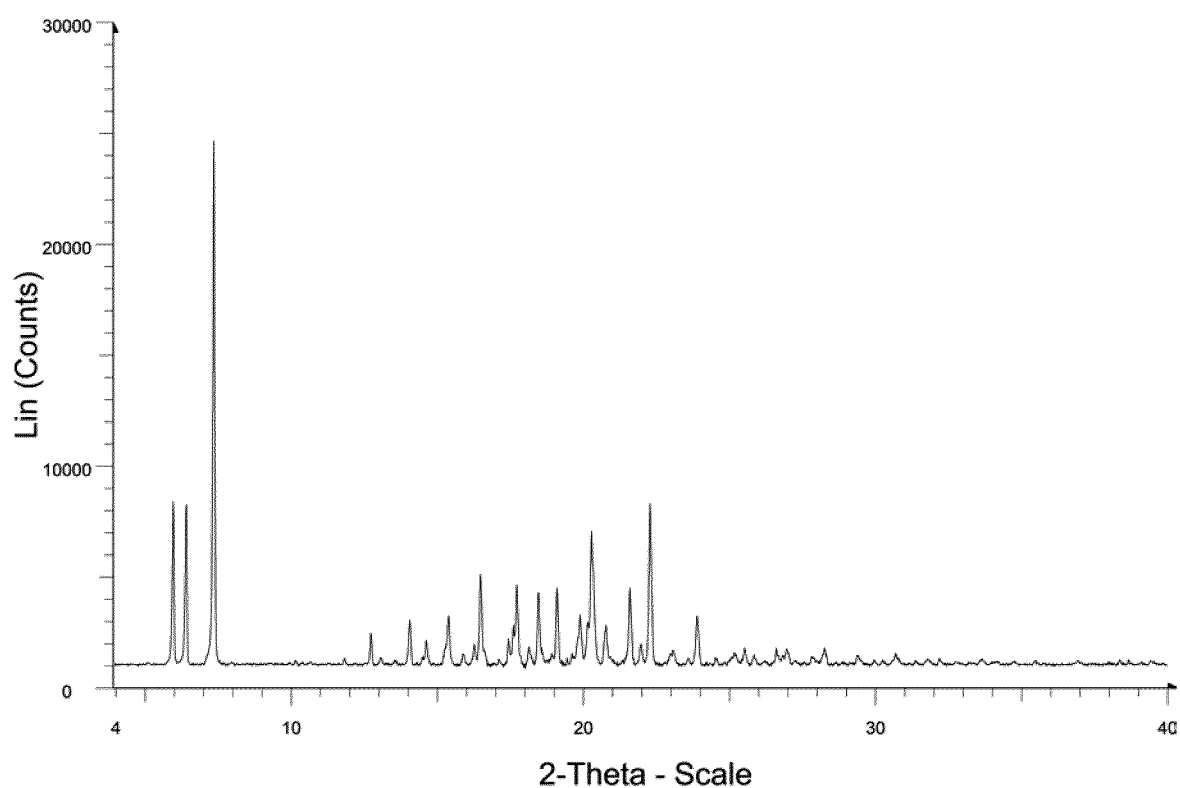

FIG. 20a is a X-ray powder diagram of 1,4-dioxane solvate of compound of formula (1) measured at room temperature.

Figure 20B:
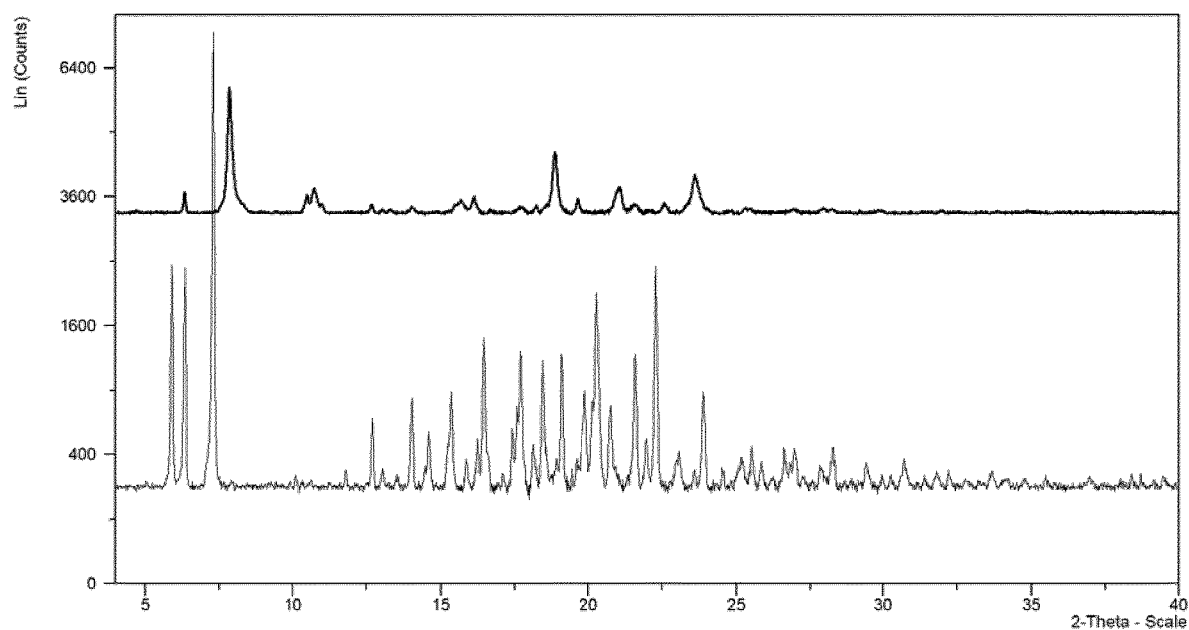

FIG. 20b is a X-ray powder diagram which comprises two X-ray powder diagrams of 1,4-dioxane solvate of compound of formula (1), respectively from bottom to top: measured at room temperature (solid line), and measured after one week at room temperature (bold line).

Anhydrate Crystalline Form 2 of Compound of Formula (1) as Well as Comparative Anhydrate Forms and Solvates of Compound of Formula (1)

Anhydrate Crystalline Form 2 of Compound of Formula (1)

As explained above, herein is provided an anhydrate crystalline form, which is Form 2 of a compound of formula (1)

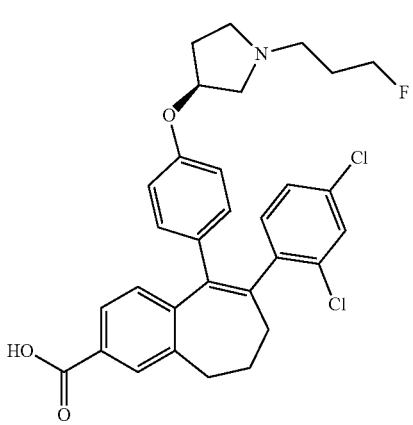

Figure 1:
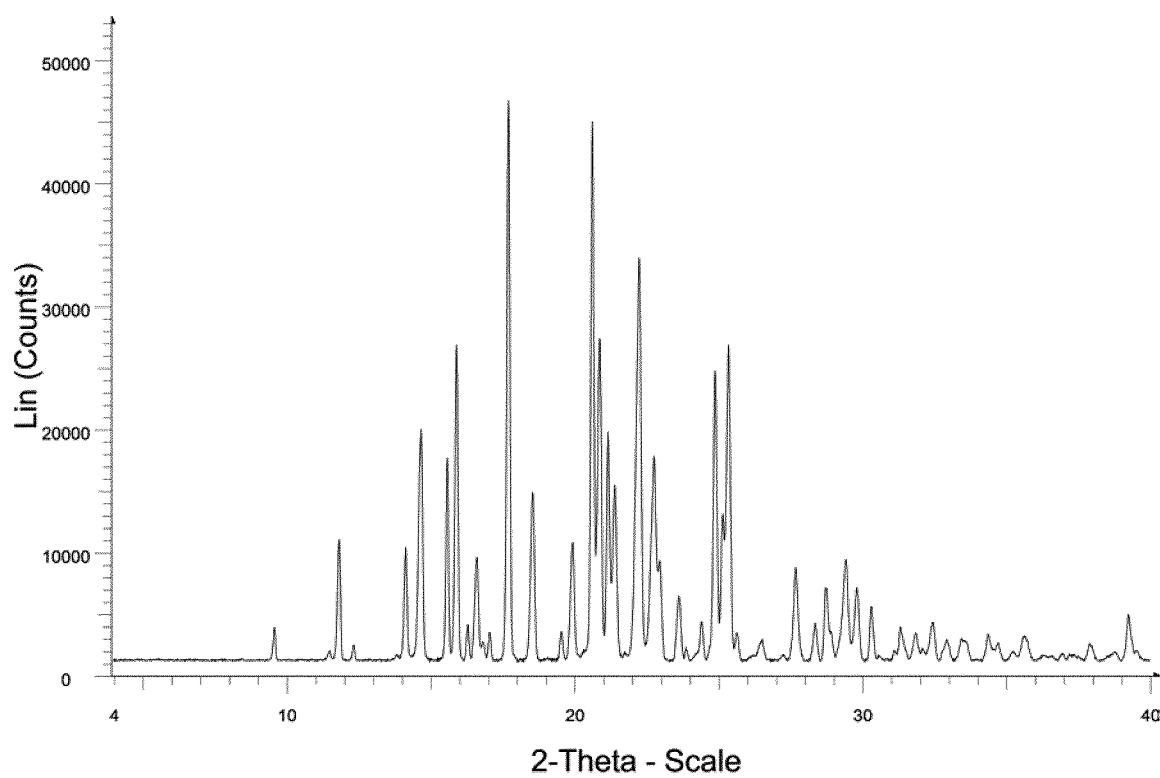
FIG. 1 is a X-ray powder diagram of the stable anhydrate crystalline Form 2 of 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid measured at room temperature.

(1)

characterized by having a powder-X-ray diffractogram displaying peaks expressed as degree 2-Theta angles at about 9.5; 11.8; 14.1; 14.6; 17.7 and 18.5 (each time ±0.2), which optionally further shows the following peaks expressed as degree 2-Theta angles at: about 15.5; 15.9; 16.6 and 22.2 (each time ±0.2), optionally further characterized by a powder X-ray diffractogram as substantially illustrated in FIG. 1.

According to one embodiment, the anhydrate crystalline Form 2 of compound of formula (1), has an X-ray power diffraction pattern comprising a peak, in terms of 2-theta angle, at about 9.5.

More particularly, a characteristic X-ray powder diffractogram of the anhydrate crystalline Form 2 of compound of formula (1) can be given substantially in FIG. 1 and its characteristic signals are summarized in the following table I:

TABLE I

| Angle (2-theta °) (±0.2) | Relative Intensity (%) |
|---|---|
| 9.5 | 8 |
| 11.8 | 24 |
| 14.1 | 22 |
| 14.6 | 43 |
| 15.5 | 38 |
| 15.9 | 57 |
| 16.6 | 21 |
| 17.7 | 100 |
| 18.5 | 32 |
| 22.2 | 73 |

Figure 2:
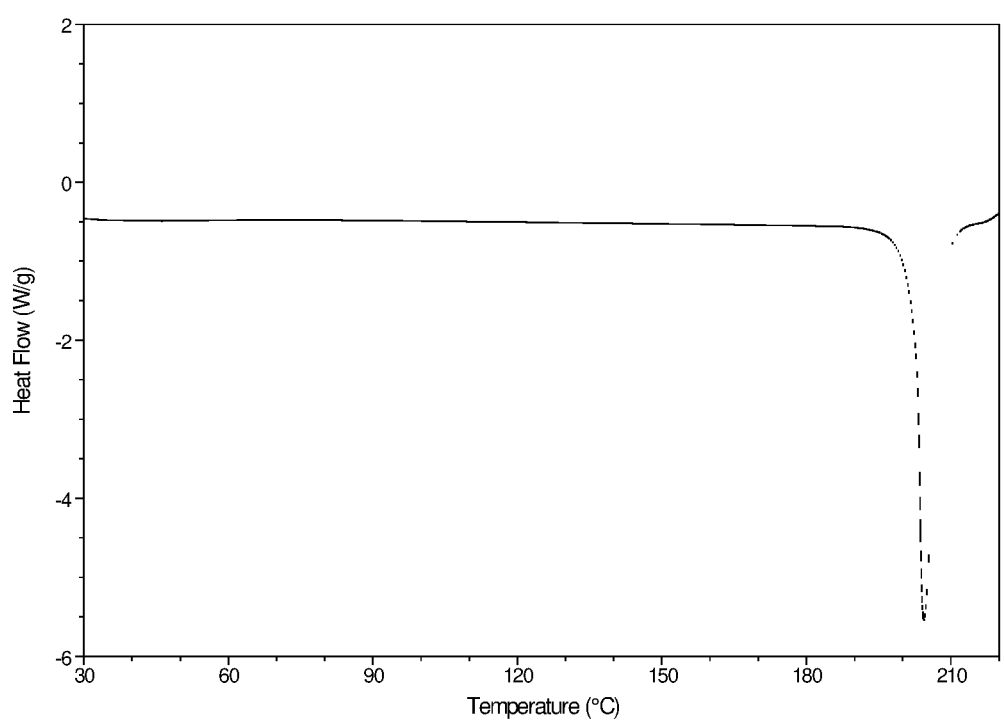
FIG. 2 is a thermogram of the stable anhydrate crystalline Form 2 of 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid.

In one embodiment, the anhydrate crystalline Form 2 of compound of formula (1) has a differential scanning calorimetry (DSC) showing a melting endotherm at about 204° C. onset (±2° C.) and is optionally further characterized by a thermogram as substantially illustrated in FIG. 2.

As indicated in the FIG. 2, this melting point temperature is associated with a relatively high enthalpy of fusion ΔHf (nearly 70 J/g).

Moreover, advantageously, exposure to temperature variations does not alter the crystal structure before its melting.

In another embodiment, the anhydrate crystalline Form 2 of compound of formula (1) is characterized by showing a weight gain of less than 0.2 weight %, in particular less than 0.1 weight %, based on the weight of the crystalline Form 2 anhydrate, as determined by Dynamic Vapor Sorption (DVS) in the range of from 0% to 95% relative humidity at a temperature of about 25° C. (±0.2° C.), and is optionally further characterized by a DVS isotherm plot shown substantially in FIG. 3.

Figure 3:
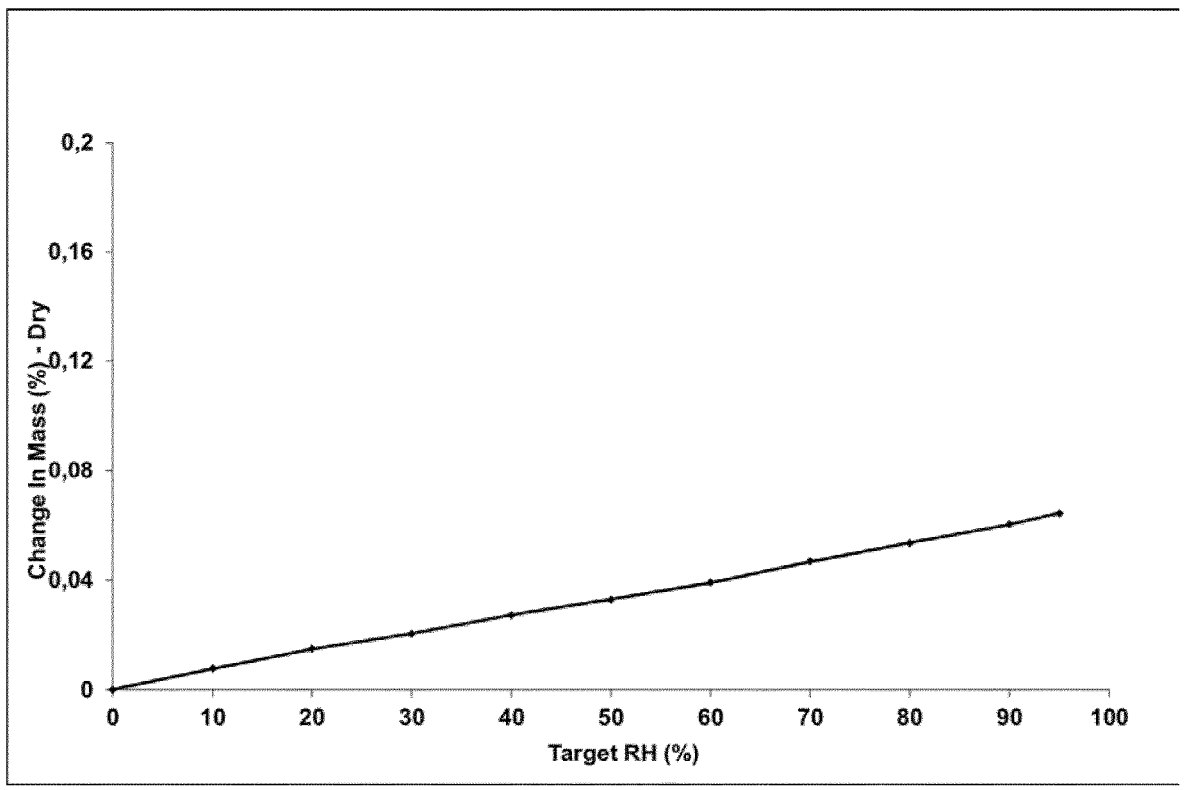
FIG. 3 is a Dynamic Vapor Sorption (DVS) isotherm plot (sorption step) of the stable anhydrate crystalline Form 2 of 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid measured at 25° C.

The characteristic data corresponding substantially to FIG. 3 are summarized in the following table II:

TABLE II

| Target RH (%) | Change in Mass (%) |
|---|---|
| 0 | 0 |
| 10 | 0.01 |
| 20 | 0.02 |
| 30 | 0.02 |
| 40 | 0.03 |
| 50 | 0.03 |
| 60 | 0.04 |
| 70 | 0.05 |
| 80 | 0.05 |
| 90 | 0.06 |
| 95 | 0.06 |

These results demonstrate that the anhydrate crystalline Form 2 of compound of formula (1) displays no hygroscopicity (water uptake of 0.06% at 95% relative humidity as substantially shown in FIG. 3).

Thus, in the sense of the present disclosure and according to the European pharmacopoeia, the term "no hygroscopicity" as used herein refers to compound showing a weight gain of less than 0.2 weight % based on the weight of the compound when measured in the range of from 0 to 95% relative humidity at about 25° C. (±0.2° C.).

In addition, the inventors have observed that the anhydrate crystalline Form 2 of compound of formula (1) does not convert to another crystalline form after exposure to moisture. Moreover, exposure to temperature variations does not alter the crystal structure before its melting.

All these elements demonstrate the stability of anhydrate Form 2.

As shown in the experimental part, the inventors have also deeply investigated on the potential of compound of formula (1) to form polymorphs (anhydrous forms and more particularly anhydrate crystalline forms 1, 3 and 4) and pseudopolymorphs (solvates and more particularly ethanol, acetone, butanol, tetrahydrofuran (THF), dichloromethane (DCM), 2-propanol, methyl tert-butyl ether (MTBE) and 1,4 dioxane solvates).

Polymorphism is the ability of a single compound to exist in more than one form or crystal structure. Different polymorphs represent distinct solids sharing the same molecular formula, yet each polymorph may have distinct physical properties. A single compound may give rise to a variety of polymorphic forms wherein each form may have different and distinct physical properties, such as different solubility profiles, different thermodynamic stability, different crystallization behaviour, different filterability, different melting point temperatures and/or different X-ray diffraction peaks. The difference in the physical properties of different polymorphic forms results from different orientation and intermolecular interactions of adjacent molecules in the solid. Polymorphic forms of a compound can be distinguished by X-ray diffraction.

A «solvate» refers to an association or complex of one or more solvent molecules and a compound of formula (1).

«The amorphous phase of a compound» is a solid that lacks the long-range order that is characteristic of a crystal. Consequently, the X-ray diffraction pattern of an amorphous phase does not show diffraction peaks.

The term «crystalline» refers to any solid substance exhibiting three-dimensional order, which in contrast to an amorphous solid substance, gives a distinctive XRPD pattern with more or less sharp peaks.

The term «anhydrate» refers to a crystal form of a substance with no water in its structure. By extension, the term "anhydrate" usually refers to a crystal form of a substance with no water and/or solvent in its structure.

The term «heterosolvate» refers to a crystalline form with more than one type of solvent included in the lattice.

Characterizations (XRPD, DSC and DVS) and some properties of these comparative anhydrate forms 1, 3 and 4 and solvates are detailed below.

As explained below, the anhydrate crystalline Form 2 of compound of formula (1) is particularly advantageous over the three other identified anhydrate crystalline forms and solvates for several reasons as detailed herein after and illustrated in the examples.

Anhydrate Crystalline Form 1 of Compound of Formula (1)

A preparation of the anhydrate crystalline Form 1 of compound of formula (1) is detailed below in comparative example 6.

Anhydrate crystalline Form 1 of compound of formula (1) was characterized by XRPD, DSC and DVS and the results are detailed below.

More particularly, a characteristic X-ray powder diffractogram of the anhydrate crystalline Form 1 of compound of formula (1) can be given substantially in FIG. 4 and its characteristic signals are summarized in the following table III:

TABLE III

| Angle (2-theta °) (±0.2) |
|---|
| 4.2 |
| 6.4 |
| 8.3 |
| 10.3 |
| 13.3 |
| 15.4 |
| 17.0 |
| 19.1 |
| 19.3 |

Figure 5:
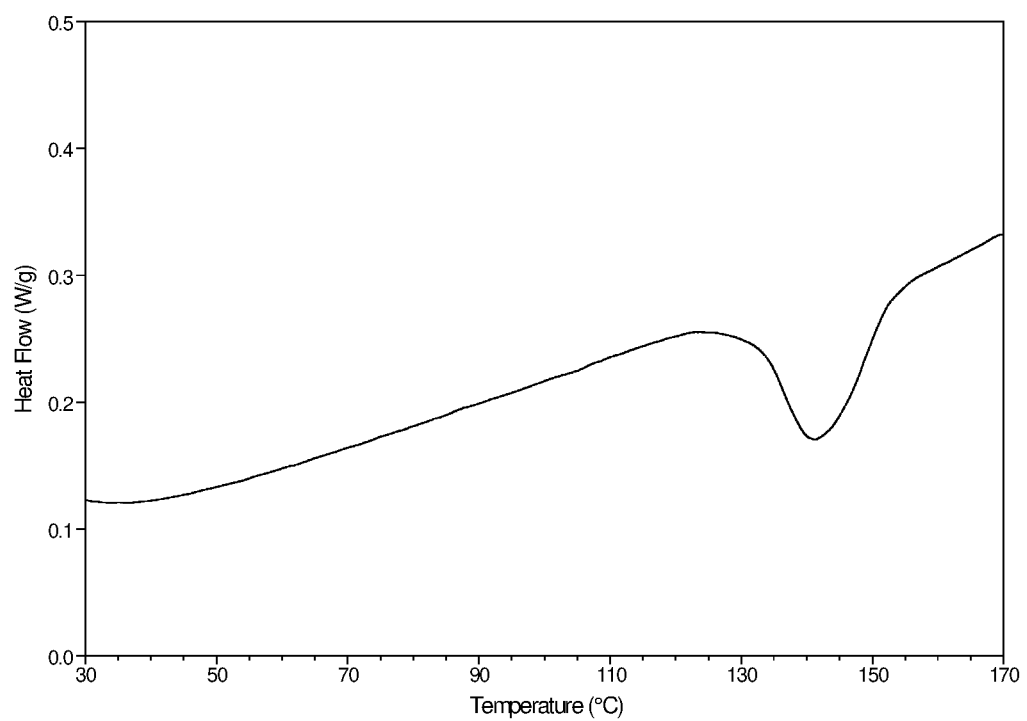
FIG. 5 is a thermogram of the anhydrate crystalline Form 1 of 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid.

As substantially indicated in FIG. 5, the anhydrate crystalline Form 1 of compound of formula (1) has a differential scanning calorimetry showing a melting endotherm at about 132° C. onset (±2° C.). This melting point temperature is associated with an enthalpy of fusion ΔHf (nearly 21 J/g) weaker than the one of the anhydrate crystalline Form 2 of compound of formula (1).

In addition, as substantially illustrated in FIG. 6 and specified in the table below, the anhydrate crystalline Form 1 of compound of formula (1) is characterized by showing a weight gain of 4.07 weight %, based on the weight of the crystalline Form 1 anhydrate, as determined by Dynamic Vapor Sorption at 95% relative humidity at a temperature of about 25° C. (±0.2° C.).

Figure 6:
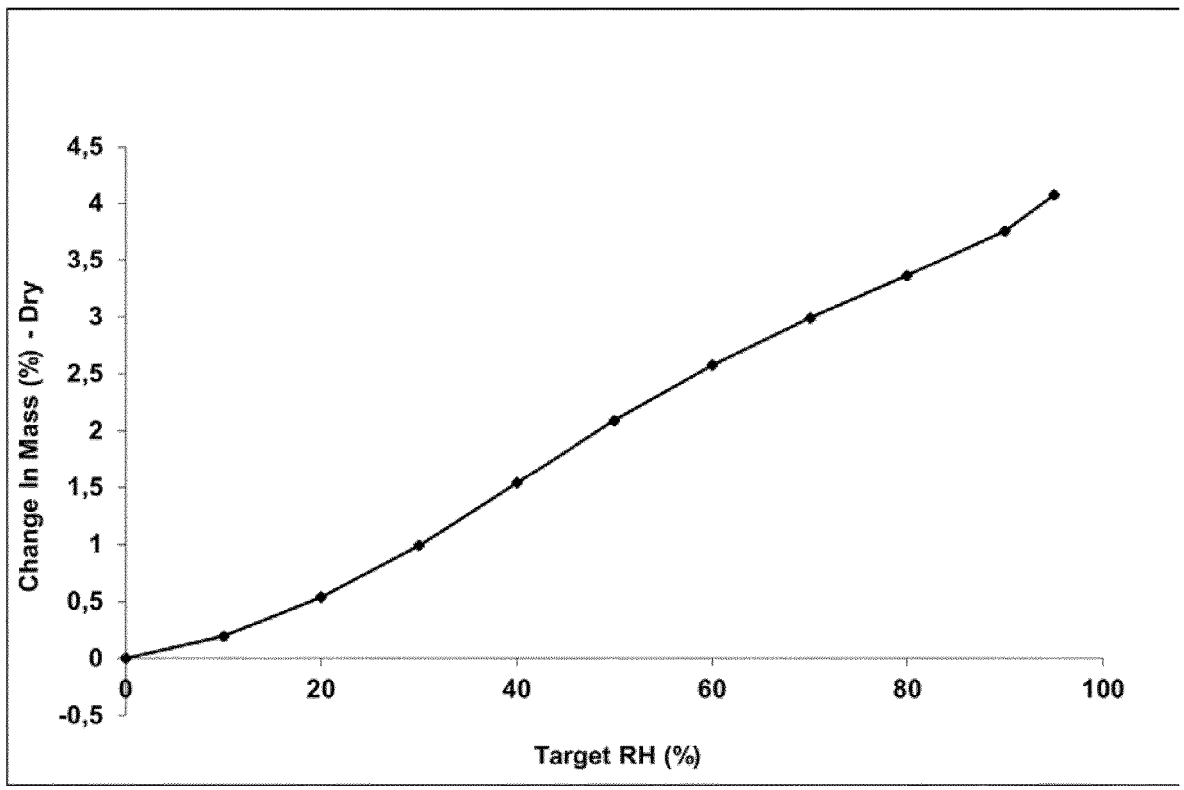
FIG. 6 is a Dynamic Vapor Sorption (DVS) isotherm plot (sorption step) of the anhydrate crystalline Form 1 of 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid measured at 25° C.

The characteristic data corresponding to substantially FIG. 6 are summarized in the following table IV:

TABLE IV

| Target RH (%) | Change in Mass (%) |
|---|---|
| 0 | 0.00 |
| 10 | 0.20 |

TABLE IV-continued

| Target RH (%) | Change in Mass (%) |
|---|---|
| 20 | 0.54 |
| 30 | 0.99 |
| 40 | 1.54 |
| 50 | 2.09 |
| 60 | 2.57 |
| 70 | 2.99 |
| 80 | 3.36 |
| 90 | 3.76 |
| 95 | 4.07 |

From the results of DSC and DVS, it comes out that the anhydrate crystalline Form 2 has advantageously a higher melting point and is less hygroscopic than the anhydrate crystalline Form 1. Indeed, as mentioned above, the anhydrate crystalline Form 2 is not hygroscopic. The anhydrate crystalline Form 2 is stable whereas the anhydrate crystalline Form 1 is metastable, meaning that the anhydrate crystalline Form 1 is expected to convert into Form 2 over time following to changes in its environment.

Anhydrate Crystalline Form 3 of Compound of Formula (1)

A preparation of the anhydrate crystalline Form 3 of compound of formula (1) is detailed below in comparative example 7.

Anhydrate crystalline Form 3 of compound of formula (1) was characterized by XRPD, DSC and DVS and the results are detailed below.

More particularly, a characteristic X-ray powder diffractogram of the anhydrate crystalline Form 3 of compound of formula (1) can be given substantially in FIG. 7 and its characteristic signals are summarized in the following table V:

TABLE V

| Angle (2-theta °) (±0.2) |
|---|
| 6.4 |
| 8.8 |
| 9.3 |
| 13.6 |
| 14.1 |
| 15.5 |
| 17.1 |
| 17.6 |
| 21.1 |

Figure 8:
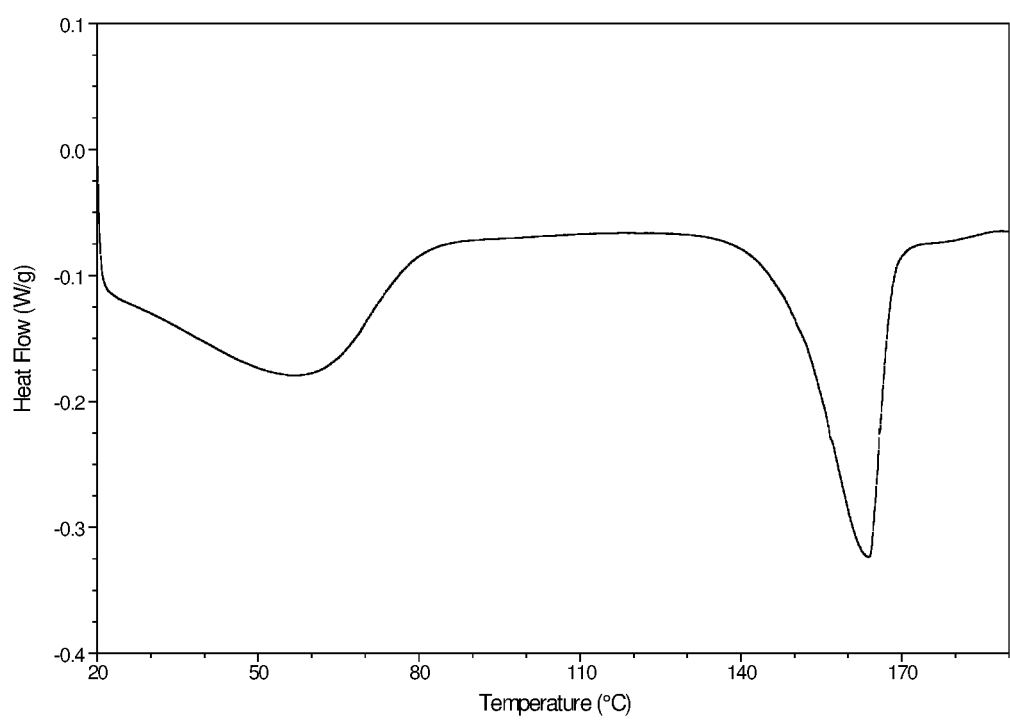
FIG. 8 is a thermogram of the anhydrate crystalline Form 3 of 6-(2,4-dichlorophenyl)-5-[4-[(3S)-1-(3-fluoropropyl)pyrrolidin-3-yl]xyphenyl]-8,9-dihydro-7H-benzo[7]annulene-2-carboxylic acid.

As substantially indicated in FIG. 8, the anhydrate crystalline Form 3 of compound of formula (1) has a differential scanning calorimetry showing a melting endotherm at about 149° C. onset (±2° C.). This melting point temperature is associated with an enthalpy of fusion ΔHf weaker (nearly 40 J/g) than the one of the anhydrate crystalline Form 2 of compound of formula (1).

In addition, as substantially illustrated in FIG. 9 and specified in the table below, the anhydrate crystalline Form 3 of compound of formula (1) is characterized by showing a weight gain of 2.92 weight %, based on the weight of the crystalline Form 3 anhydrate, as determined by Dynamic Vapor Sorption at 95% relative humidity at a temperature of about 25° C. (±0.2° C.).

Figure 9:
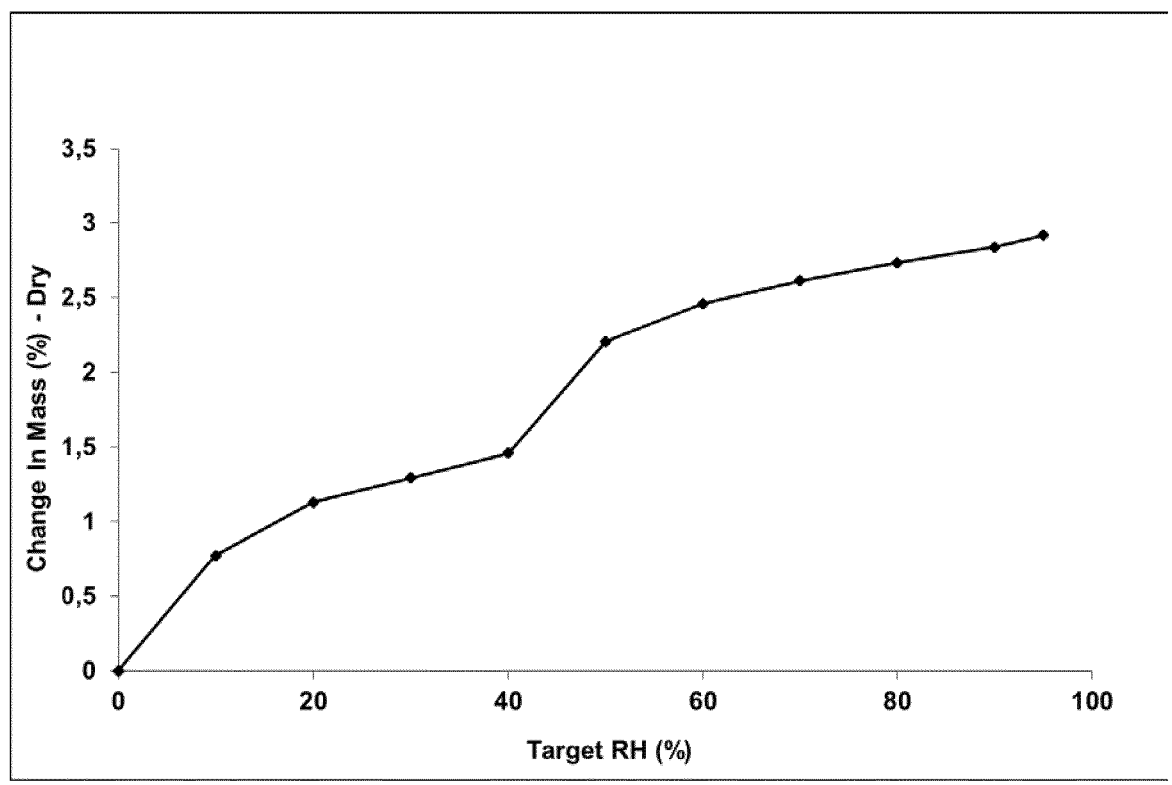
FIG. 9 is a Dynamic Vapor Sorption (DVS) isotherm plot (sorption step) of the anhydrate crystalline Form 3 of 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid measured at 25° C.

The characteristic data corresponding to substantially FIG. 9 are summarized in the following table VI:

TABLE VI

| Target RH (%) | Change in Mass (%) Sorption step |
|---|---|
| 0 | 0.00 |
| 10 | 0.78 |
| 20 | 1.13 |
| 30 | 1.29 |
| 40 | 1.46 |
| 50 | 2.21 |
| 60 | 2.46 |
| 70 | 2.62 |
| 80 | 2.73 |
| 90 | 2.84 |
| 95 | 2.92 |

From the results of DSC and DVS, it comes out that the anhydrate crystalline Form 2 has advantageously a higher melting point and is less hygroscopic than the anhydrate crystalline Form 3. Indeed, as mentioned above, the anhydrate crystalline Form 2 is not hygroscopic. The anhydrate crystalline Form 2 is stable whereas the anhydrate crystalline Form 3 is metastable meaning that the anhydrate crystalline Form 3 is expected to convert into Form 2 over time following to changes in its environment.

Anhydrate Crystalline Form 4 of Compound of Formula (1)

A preparation of the anhydrate crystalline Form 4 of compound of formula (1) is detailed below in comparative example 8.

Anhydrate crystalline Form 4 of compound of formula (1) was characterized by XRPD, DSC and DVS and the results are detailed below.

Figure 10:
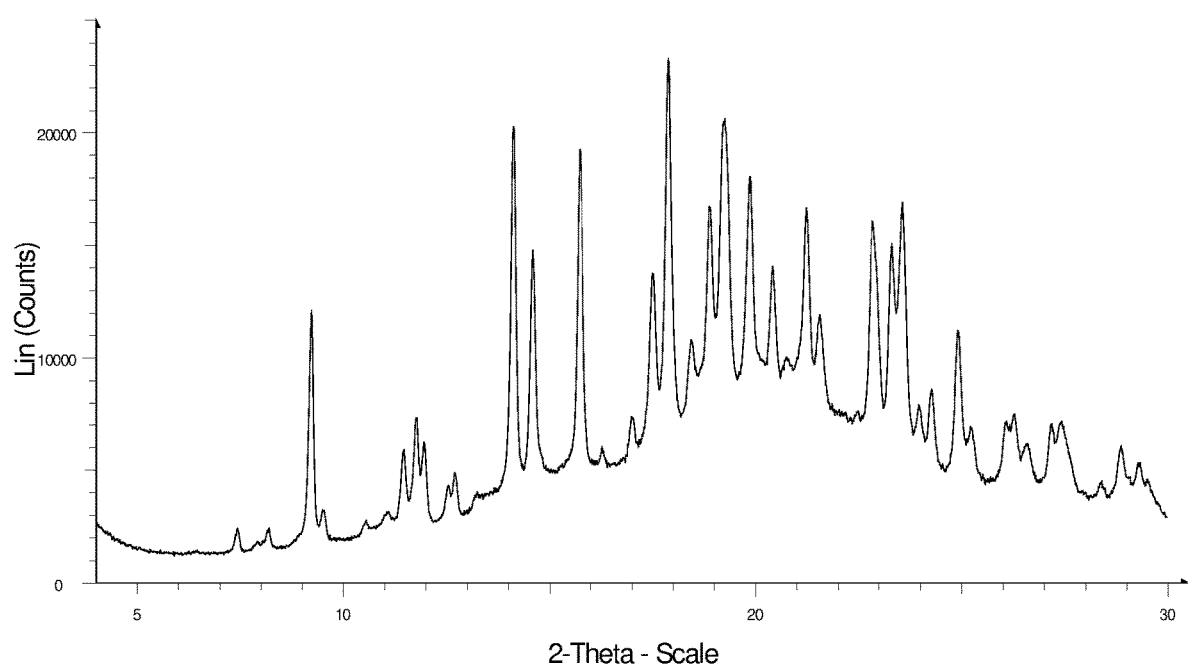
FIG. 10 is a X-ray powder diagram of the anhydrate crystalline Form 4 of 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid measured at room temperature.

More particularly, a characteristic X-ray powder diffractogram of the anhydrate crystalline Form 4 of compound of formula (1) can be given substantially in FIG. 10 and its characteristic signals are summarized in the following table VII:

TABLE VII

| Angle (2-theta °) (±0.2) |
|---|
| 9.2 |
| 14.1 |
| 14.6 |
| 15.7 |
| 17.5 |
| 17.9 |
| 19.8 |

Figure 11:
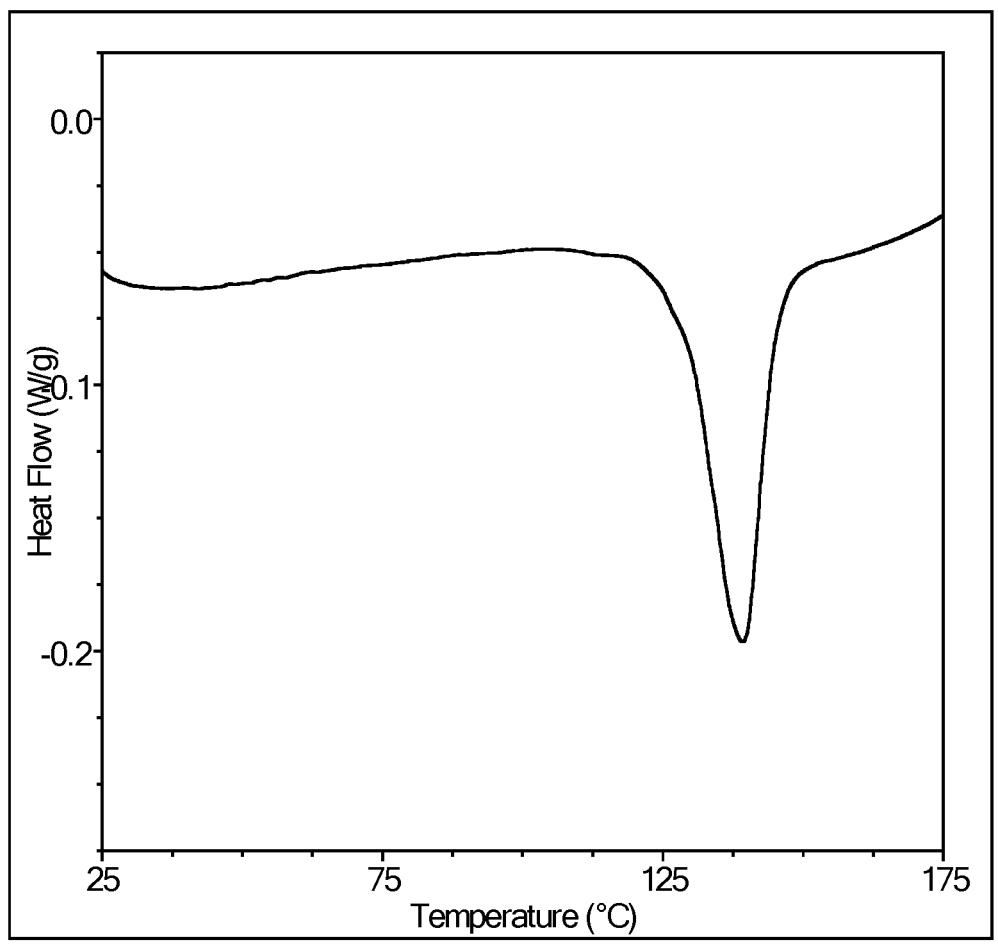
FIG. 11 is a thermogram of the anhydrate crystalline Form 4 of 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid.

As substantially indicated in FIG. 11, the anhydrate crystalline Form 4 of compound of formula (1) has a differential scanning calorimetry showing a melting endotherm at about 130° C. onset (±2° C.). This melting point temperature is associated with an enthalpy of fusion ΔHf (nearly 22 J/g) weaker than the one of the anhydrate crystalline Form 2 of compound of formula (1).

In addition, as substantially illustrated in FIG. 12 and specified in the table VIII below, the anhydrate crystalline Form 4 of compound of formula (1) is characterized by showing a weight gain of 0.75 weight %, based on the weight of the crystalline Form 4 anhydrate, as determined by Dynamic Vapor Sorption at 90% relative humidity at a temperature of about 25° C. (±0.2° C.).

Figure 12:
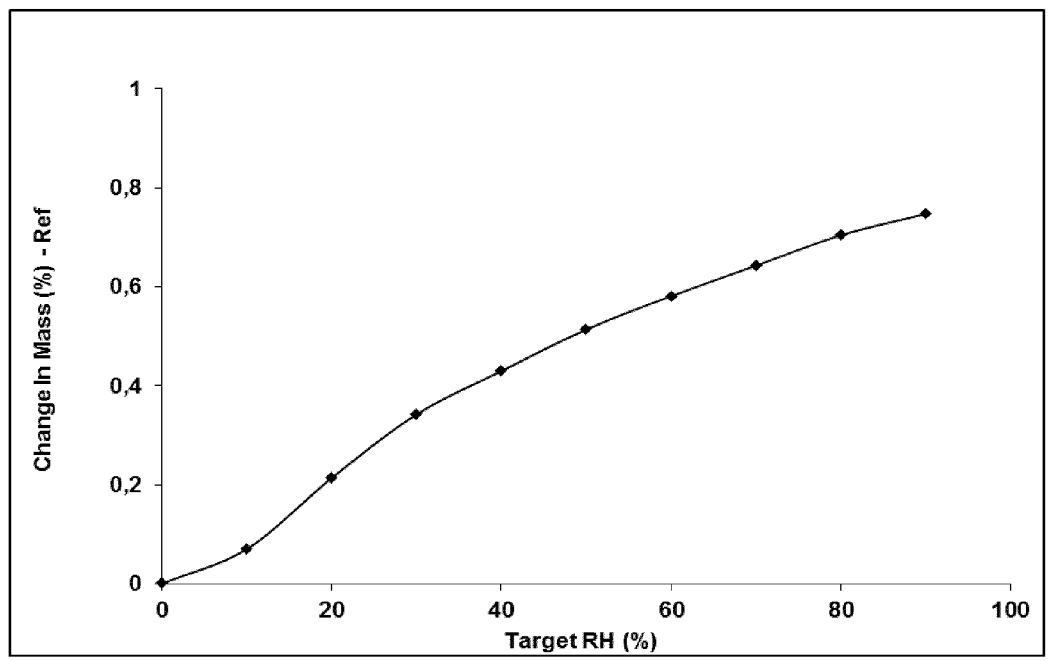
FIG. 12 is a Dynamic Vapor Sorption (DVS) isotherm plot (sorption step) of the anhydrate crystalline Form 4 of 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid measured at 25° C.

The characteristic data corresponding substantially to FIG. 12 are summarized in the following table VIII:

TABLE VIII

| Target RH (%) | Change in Mass (%) |
|---|---|
| 0 | 0.00 |
| 10 | 0.07 |
| 20 | 0.21 |
| 30 | 0.34 |
| 40 | 0.43 |
| 50 | 0.51 |
| 60 | 0.58 |
| 70 | 0.64 |
| 80 | 0.71 |
| 90 | 0.75 |

From the results of DSC and DVS, it comes out that the anhydrate crystalline Form 2 has advantageously a higher melting point and is less hygroscopic than the anhydrate crystalline Form 4. Indeed, as mentioned above, the anhydrate crystalline Form 2 is not hygroscopic. The anhydrate crystalline Form 2 is stable whereas the anhydrate crystalline Form 4 is metastable, meaning that the anhydrate crystalline Form 4 is expected to convert into Form 2 over time following to changes in its environment.

Ethanol Solvate of Compound of Formula (1)

A preparation of this ethanol solvate is detailed below in comparative example 9. This solvate was characterized by XRPD and the results are detailed below.

More particularly, a characteristic X-ray powder diffractogram of this ethanol solvate of compound of formula (1) under ethanol vapor measured at room temperature can be given substantially in FIG. 13*a* and its characteristic signals are summarized in the following table IX:

TABLE IX

| Angle (2-theta °) (±0.2) |
|---|
| 6.3 |
| 7.6 |
| 10.2 |
| 10.5 |
| 10.8 |
| 13.1 |
| 13.8 |
| 15.1 |
| 15.9 |
| 18.7 |
| 20.4 |
| 23.2 |

Figure 13A:
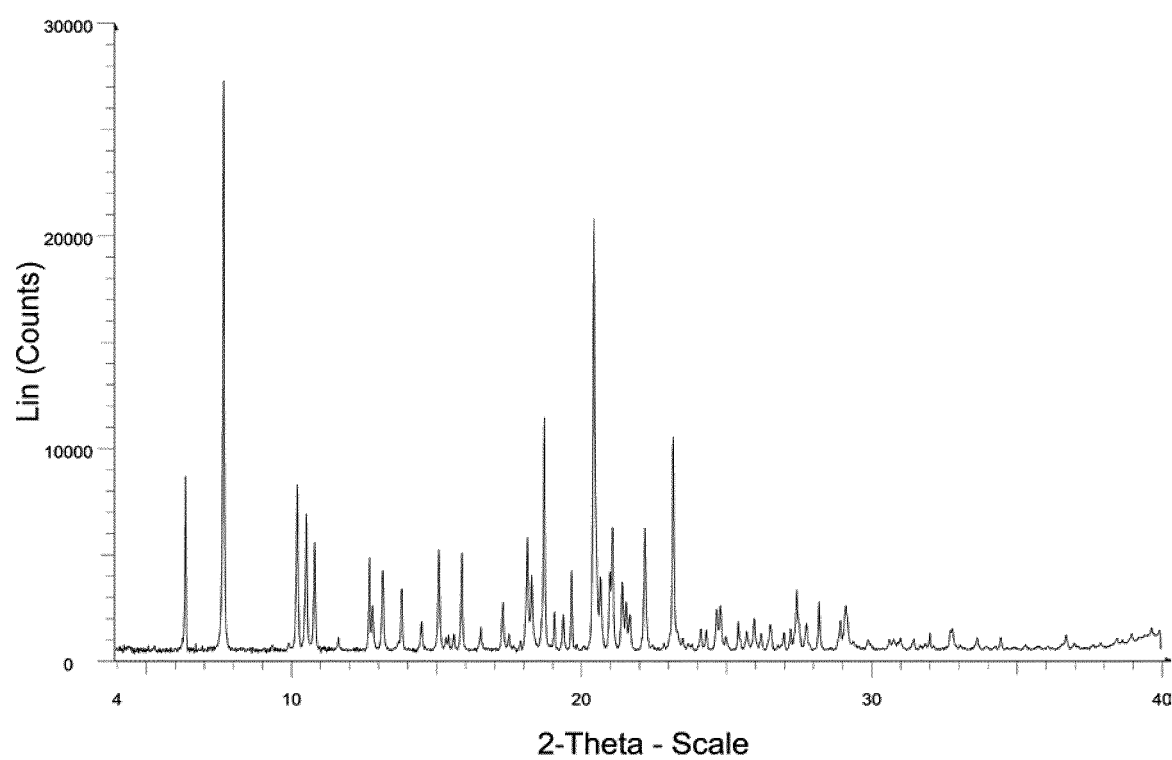
FIG. 13a is a X-ray powder diagram of ethanol solvate of compound of formula (1) under ethanol vapor, measured at room temperature.
Figure 13B:
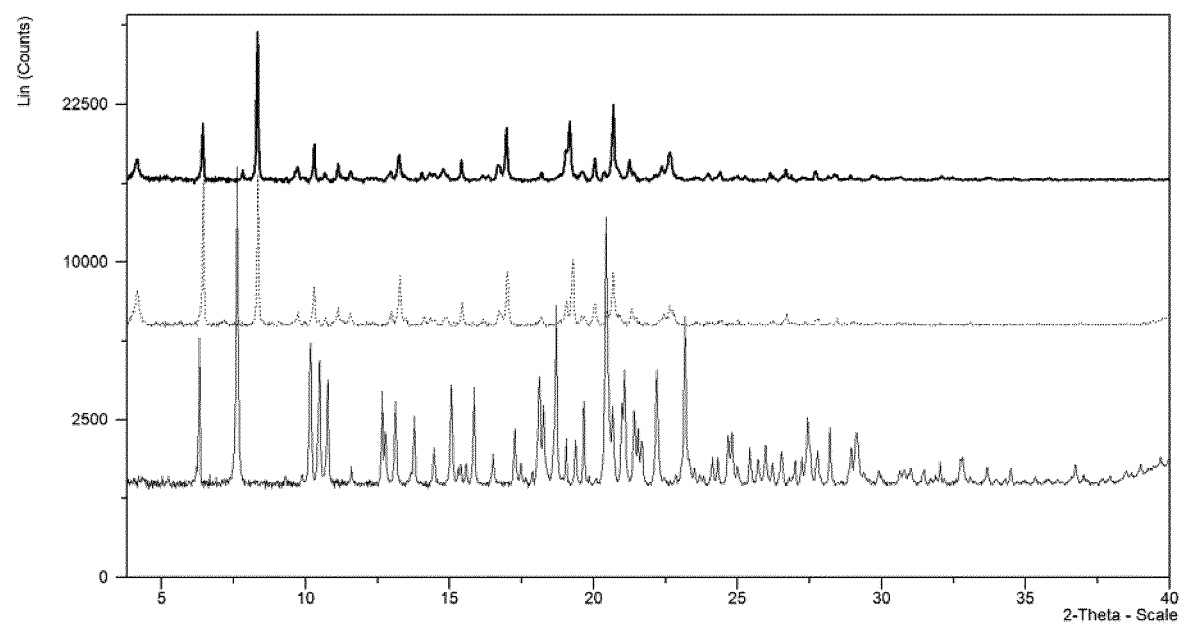
FIG. 13b is a X-ray powder diagram which comprises three X-ray powder diagrams of ethanol solvate of compound of formula (1) respectively from bottom to top: (a) under ethanol vapor (solid line), (b) at 40° C. (dotted line), and (c) after exposure to humidity (bold line), measured at room temperature.

The inventors have observed that exposure to heat (for example 40° C.) and/or moisture of this ethanol solvate generally results in the formation of the anhydrate Form 1, as substantially shown in FIG. 13*b*. In addition, ethanol vapors onto partially desolvated sample lead to the initial ethanol solvate.

Thus, this ethanol solvate is unstable.

Acetone Solvate of Compound of Formula (1)

A preparation of this acetone solvate is detailed below in comparative example 10. This solvate was characterized by XRPD and the results are detailed below.

More particularly, a characteristic X-ray powder diffractogram of this acetone solvate of compound of formula (1) under acetone vapor measured at room temperature can be given substantially in FIG. 14*a* and its characteristic signals are summarized in the following table X:

TABLE X

| Angle (2-theta °) (±0.2) |
|---|
| 6.4 |
| 7.4 |
| 10.0 |
| 10.3 |
| 12.7 |
| 15.6 |
| 16.8 |
| 17.3 |
| 17.7 |
| 18.0 |
| 18.6 |
| 19.2 |

Figure 14A:
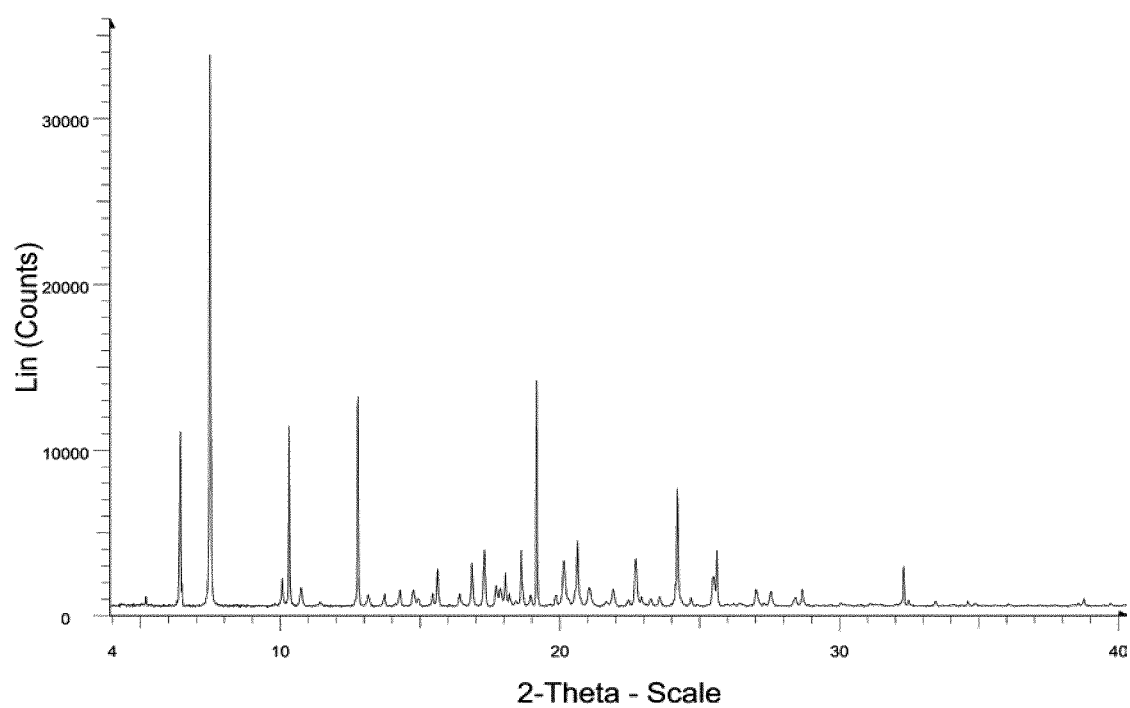
FIG. 14a is a X-ray powder diagram of acetone solvate of compound of formula (1) under acetone vapor measured at room temperature.
Figure 14B:
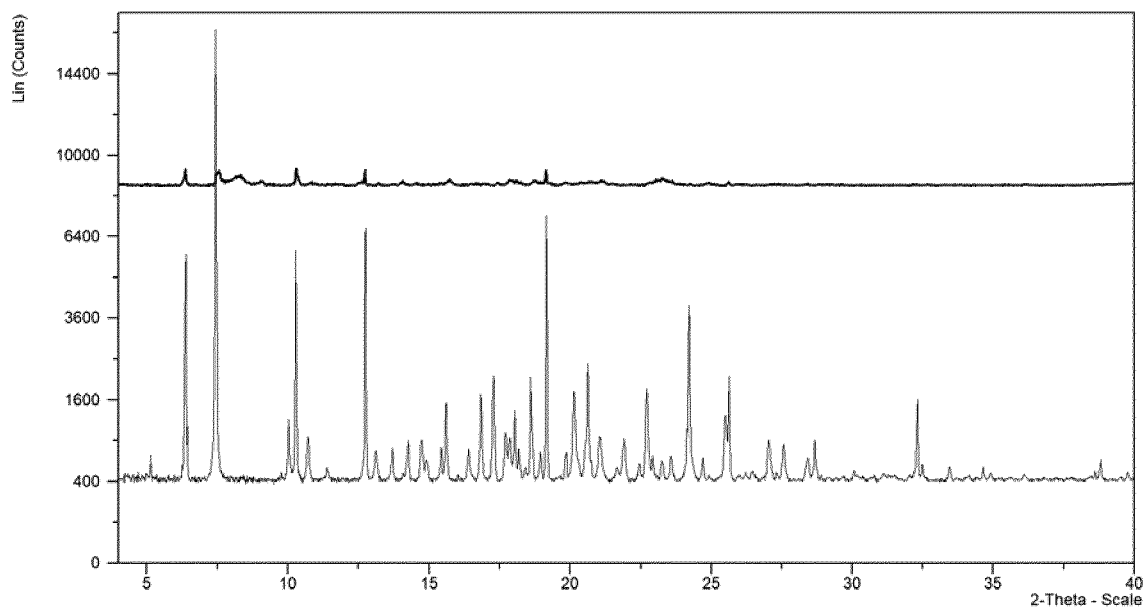
FIG. 14b is a X-ray powder diagram which comprises two X-ray powder diagrams of acetone solvate of compound of formula (1) respectively from bottom to top.

The inventors have observed that this acetone solvate is physically unstable and generally converts to low crystalline materials upon exposure to ambient conditions or dry nitrogen a shown substantially in FIG. 14*b*.

Butanol Solvate of Compound of Formula (1)

A preparation of this butanol solvate is detailed below in comparative example 11. This solvate was characterized by XRPD and the results are detailed below.

More particularly, a characteristic X-ray powder diffractogram of this butanol solvate of compound of formula (1) under butanol vapor measured at room temperature can be given substantially in FIG. 15*a* and its characteristic signals are summarized in the following table XI:

TABLE XI

| Angle (2-theta °) (±0.2) |
|---|
| 6.1 |
| 7.0 |
| 10.9 |
| 13.4 |
| 14.4 |
| 15.9 |
| 16.2 |
| 19.6 |
| 19.9 |
| 20.1 |

The inventors have observed that this butanol solvate has to be considered rather as a heterosolvate (1:2:1 water:butanol:active pharmaceutical ingredient) which is physically unstable and generally converts to an amorphous form upon exposure to ambient conditions or dry nitrogen as substantially shown in FIG. 15*b*.

Dichloromethane (DCM) solvate of compound of formula (1) A preparation of this DCM solvate is detailed below in comparative example 12. This solvate was characterized by XRPD and the results are detailed below.

More particularly, a characteristic X-ray powder diffractogram of this DCM solvate of compound of formula (1) under DCM vapor measured at room temperature can be given substantially in FIG. 16 and its characteristic signals are summarized in the following table XII:

TABLE XII

| Angle (2-theta °) (±0.2) |
|---|
| 7.3 |
| 10.4 |
| 11.0 |
| 12.9 |
| 13.3 |
| 14.0 |
| 15.4 |
| 16.0 |
| 18.7 |
| 20.9 |

The inventors have observed that exposure to heat and/or moisture of this DCM solvate generally results in the formation of the anhydrate Form 1. The inventors have observed that exposure to heat and/or N2 of this DCM solvate generally results in the formation of the anhydrate Form 4. Thus, this DCM solvate is unstable.

Tetrahydrofuran (THF) Solvate of Compound of Formula (1)

A preparation of this THF solvate is detailed below in comparative example 13. This solvate was characterized by XRPD and the results are detailed below.

More particularly, a characteristic X-ray powder diffractogram of this THF solvate of compound of formula (1) under THF vapor measured at room temperature can be given substantially in FIG. 17 and its characteristic signals are summarized in the following table XIII:

TABLE XIII

| Angle (2-theta °) (±0.2) |
|---|
| 6.4 |
| 7.5 |
| 12.5 |
| 13.7 |
| 14.0 |
| 14.7 |
| 15.4 |
| 16.1 |
| 20.2 |
| 21.0 |
| 21.5 |

The inventors have observed that exposure to heat and/or moisture of this THF solvate generally results in the formation of the anhydrate form 1. Thus, this THF solvate is unstable.

2-Propanol Solvate of Compound of Formula (1)

A preparation of this 2-propanol solvate is detailed below in comparative example 14. This solvate was characterized by HR XRPD and the results are detailed below.

More particularly, a characteristic HR X-ray powder diffractogram of this 2-propanol solvate of compound of formula (1) measured at room temperature can be given substantially in FIG. 18 and its characteristic signals are summarized in the following table XIV:

TABLE XIV

| Angle (2-theta °) (±0.2) |
|---|
| 5.6 |
| 8.3 |
| 12.7 |
| 14.2 |

TABLE XIV-continued

| Angle (2-theta °) (±0.2) |
| --- |
| 16.5 |
| 21.7 |
| 23.1 |

The inventors have observed that upon heating, this 2-propanol solvate generally transforms into anhydrate Form 3 which itself generally transforms into anhydrate Form 2.

Methyl Tert-Butyl Ether (MTBE) Solvate of Compound of Formula (1)

A preparation of this MTBE solvate is detailed below in comparative example 15. This solvate was characterized by XRPD and the results are detailed below.

More particularly, a characteristic X-ray powder diffractogram of this MTBE solvate of compound of formula (1) measured at room temperature can be given substantially in FIG. 19 and its characteristic signals are summarized in the following table XV:

TABLE XV

| Angle (2-theta °) (±0.2) |
| --- |
| 5.0 |
| 10.0 |
| 12.8 |
| 15.0 |
| 17.5 |
| 22.1 |
| 25.1 |

According to the XRPD analysis, this MTBE solvate is the least well crystallized of the other disclosed solvates.

The inventors have also observed that this MTBE solvate, upon heating, generally melts at 80° C. associated with an enthalpy of fusion ΔHf of nearly 10 J/g.

1,4-Dioxane Solvate of Compound of Formula (1)

A preparation of this 1,4-dioxane solvate is detailed below in comparative example 16. This solvate was characterized by XRPD and the results are detailed below.

More particularly, a characteristic X-ray powder diffractogram of this 1,4-dioxane solvate of compound of formula (1) measured at room temperature can be given substantially in FIG. 20a and its characteristic signals are summarized in the following table XVI:

TABLE XVI

| Angle (2-theta °) (±0.2) |
| --- |
| 5.9 |
| 6.3 |
| 7.3 |
| 12.7 |
| 14.0 |
| 15.4 |
| 16.5 |

The inventors have observed that this 1,4-dioxane solvate is physically unstable and generally converts at room temperature to an unknown poorly crystallized solid form. The non-stability of 1,4-dioxane solvate after one week at room temperature is substantially illustrated by FIG. 20b.

CONCLUSION

In view of the results provided above, it has been demonstrated that the anhydrate crystalline Form 2 of compound of formula (1) possesses more advantageous properties than anhydrate crystalline forms 1, 3 and 4 of compound of formula (1) and solvates of compound of formula (1) (ethanol, acetone, butanol, THF, DCM, 2-propanol, MTBE and 1,4-dioxane solvates), particularly in terms of stability at least under ambient conditions of temperature and pressure, stability under humidity conditions (hygroscopicity), value of melting point, etc.

The anhydrate crystalline Form 2 of compound of formula (1) appears thus to be the most suitable product for use and storage at an industrial scale. Indeed, the anhydrate crystalline Form 2 of compound of formula (1) is not hygroscopic and stable (value of melting point, value of enthalpy of fusion, etc.) as indicated above.

Processes for the Preparation of Anhydrate Crystalline Form 2 of Compound of Formula (1)

As indicated above, herein are also provided processes for preparing anhydrate crystalline Form 2 of 6-(2,4-dichlorophenyl)-5-[4- [(3S)-1-(3-fluoropropyl)pyrrolidin-3-yl]oxyphenyl]-8,9-dihydro-7H-benzo[7]annulene-2-carboxylic acid.

Anhydrate crystalline Form 2 of compound of formula (1) may be obtained by conventional crystallization techniques known to one of skill in the Art, such as crystallization by evaporation, crystallization by cooling, or crystallization by adding a non-solvent such as water or heptane.

Optionally, the step 1 of the processes as described herein after may also be carried out by implementing seeding, i.e. by using seeds of anhydrate Form 2 of compound of formula (1) previously obtained. Example 5 illustrates a route of synthesis using seeding.

In the sense of the present disclosure, a "set temperature" means a temperature which remains the same during the corresponding step.

In the context of the present disclosure, the expression "almost complete evaporation" of a solvent means that the evaporation is not carried out in full, that is to say that the amount of solvent which is evaporated is decreased but nevertheless still present in a very low content. In other terms, the evaporation must not be carried out dry.

Crystallization by Evaporation

According to one embodiment, a process for the preparation of anhydrate crystalline Form 2 of the compound of formula (1), comprises at least the following steps:

1) solubilizing the compound of formula (1) in amorphous form in a solvent selected from alcohols, ketones, acetates, ethers and acetonitrile, optionally in admixture with water, at a set temperature ranging from 18° C. to 80° C.;

2) leaving the solution obtained in step 1) at the same temperature as the one set in step 1) for almost complete evaporation;

3) isolating the anhydrate crystalline Form 2 of compound of formula (1) formed in step 2).

In a particular embodiment, the solvent of step 1) is selected from methanol, methanol/water mixture, ethanol, ethanol/water mixture, 2-propanol, 1-propanol, 1-propanol/water mixture, 1-butanol, 1-butanol/water mixture, acetone, acetone/water mixture, 2-butanone (also named methyl ethyl ketone or MEK), 2-butanone/water mixture, methyl isobutyl ketone (also named MIBK), methyl isobutyl ketone/water mixture, methyl acetate, methyl acetate/water mixture, ethyl acetate, ethyl acetate/water mixture, isopropyl acetate, isopropyl acetate/water mixture, isobutyl acetate, isobutyl acetate/water mixture, acetonitrile, and methyl tert-butyl ether (also named MTBE).

In a more particular embodiment, the solvent of step 1) is selected from methanol, methanol/water mixture, ethanol, ethanol/water mixture, 2-propanol, 1-propanol, 1-propanol/water mixture, 1-butanol/water mixture, acetone, acetone/water mixture, 2-butanone, 2-butanone/water mixture, methyl isobutyl ketone/water mixture, methyl acetate, methyl acetate/water mixture, ethyl acetate, ethyl acetate/water mixture, isopropyl acetate/water mixture, isobutyl acetate, isobutyl acetate/water mixture, and acetonitrile.

In still another embodiment, the solvent of step 1) is selected from methanol, ethanol, 1-propanol, 2-propanol, 1-butanol, 2-butanone, methyl isobutyl ketone, methyl acetate, ethyl acetate, isopropyl acetate, isobutyl acetate, acetonitrile, methanol/water mixture, ethanol/water mixture, 1-propanol/water mixture, 1-butanol/water mixture, 2-butanone/water mixture, methyl isobutyl ketone/water mixture, methyl acetate/water mixture, ethyl acetate/water mixture, isopropyl acetate/water mixture, isobutyl acetate/water mixture, and methyl isobutyl ketone/water mixture.

When the solvent of step 1) is in admixture with water, the solvent/water volume ratio is typically 99/1.

According to another embodiment, the set temperature of step 1) and step 2) is selected from a range of temperature from 20° C. to 80° C., or even from 25° C. to 80° C.

Crystallization by Cooling

According to another embodiment, a process for the preparation of anhydrate crystalline form 2 of the compound of formula (1), comprises at least the following steps:

1) solubilizing or suspending the compound of formula (1) in amorphous form in a solvent selected from alcohols, ketones, acetates, ethers and acetonitrile, at a set temperature which is room temperature;

2) optionally purifying the solution or suspension obtained in step 1) by heating at a set temperature ranging from 60° C. to 80° C., stirring and filtering the solution or suspension;

3) heating the solution or suspension obtained in step 1) or in step 2) at a set temperature ranging from 60° C. to 80° C.;

4) cooling the solution or suspension obtained in step 2) to a set temperature ranging from −20° C. to 25° C.;

5) isolating the anhydrate crystalline Form 2 of compound of formula (1) formed in step 4).

The optional step 2) allows advantageously the elimination of impurities or germs that may be present in the solution or suspension.

In a particular embodiment, the solvent of step 1) is selected from ethanol, 2-propanol, 1-propanol, 1-butanol, acetone, 2-butanone (also named methyl ethyl ketone or MEK), methyl isobutyl ketone (also named MIBK), isopentyl methyl ketone (also named MIAK), methyl acetate, ethyl acetate, isopropyl acetate, isobutyl acetate, acetonitrile, and methyl tert-butyl ether (also named MTBE).

In an embodiment, the solvent of step 1) is acetone.

According to one variant, the set temperature of step 1) is the same as the one of step 4).

According to another variant, the set temperature of step 1) is the same as the one of step 4) and the set temperature of step 2) is the same as the one of step 3).

Crystallization by Adding Water as a Non-Solvent.

According to another embodiment, a process for the preparation of the anhydrate crystalline Form 2 of compound of formula (1), comprises at least the following steps:

1) solubilizing or suspending the compound of formula (1) in amorphous form in a solvent selected from alcohols, ketones, acetates, and diethyl-ether, at a set temperature which is room temperature;

2) optionally filtering the solution or suspension obtained in step 1);

3) adding water as a non-solvent;

4) isolating the anhydrate crystalline Form 2 of compound of formula (1) formed in step 3).

The optional step 2) of filtering allows advantageously to remove impurities or germs that may be present in the solution or suspension.

In a particular embodiment, the solvent of step 1) is selected from 2-propanol, 1-propanol, 1-butanol, acetone, 2-butanone, methyl isobutyl ketone, isopentyl methyl ketone, methyl acetate, ethyl acetate, isopropyl acetate, isobutyl acetate, and diethyl ether.

Optionally, after step 3) the solvent is left to evaporate.

Crystallization by Adding Heptane as a Non-Solvent.

According to another embodiment, a process for the preparation of the anhydrate crystalline Form 2 of the compound of formula (1), comprises at least the following steps:

1) solubilizing or suspending the compound of formula (1) in amorphous form in a solvent selected from alcohols, ketones, and acetates, at a set temperature which is room temperature;

2) optionally filtering the solution or suspension obtained in step 1); 3) adding heptane as a non-solvent;

4) isolating the anhydrate crystalline Form 2 of compound of formula (1) formed in step 3).

The optional step 2) of filtering allows advantageously to remove impurities or germs that may be present in the solution or suspension.

In a particular embodiment, the solvent of step 1) is selected from ethanol, 2-propanol, 1-propanol, 1-butanol, acetone, 2-butanone, methyl isobutyl ketone, isopentyl methyl ketone, methyl acetate, ethyl acetate, isopropyl acetate, and isobutyl acetate.

Crystallization by Seeding.

According to another embodiment, the anhydrate crystalline Form 2 of the compound of formula (1) can be obtained by a seeding process, i.e. by using seeds of anhydrate crystalline Form 2 obtained previously. Seeding is a crystallization technique well-known in the Art. Such seeding process may for example comprise the following steps:

1) solubilizing the compound of formula (1) in amorphous form in an organic solvent, such as 2-methyltetrahydrofuran or dichloromethane;

2) adding seeds of anhydrate crystalline Form 2 of the compound of formula (1).

In an embodiment, the seeding process is carried out at a temperature comprised between room temperature and a mild heating, for example at about 28° C. (±3° C.). In another embodiment, the seeding process comprises a step 3) of solvent exchange, comprising the step of adding a non-solvent, such as acetone. The crystals of anhydrate crystalline Form 2 of the compound of formula (1) are then recovered by filtration of the reaction medium and drying.

EXAMPLES

Material and Methods

I. Differential Scanning Calorimetry (DSC) DSC analyses were carried out on a Q1000 analyzer (TA Instruments). Sample masses of few mg were deposited in an unsealed aluminium pan and the atmosphere was regulated by a constant nitrogen flow. Analyses have been carried out, with a scanning rate of 5° C./min.

II. X-Ray Powder Diffraction (XRPD)

Analyses were carried out at room temperature on a Brucker D4 Endeavor instrument using the Bragg-Brentano parafocusing geometry. A sealed copper anode X-ray tube was used ($\lambda$, CuK$\alpha$ average=1.54178 Å). A LynxEye linear detector completed the setup. A counting time of few seconds per step in an angular range of from few 2-Theta degrees to several dozen 2-Theta degrees with a 0.016° step size in 2θ was used for each sample analysis.

For each experiment, the powder was deposited onto the surface of a sample holder.

III. Water Sorption Isotherms Using Dynamic Vapor Sorption (DVS)

Experiments were performed on DVS automated gravimetric vapor sorption analyzer (Surface Measurement Systems Ltd., London, UK). Uptake and loss of water by the sample were gravimetrically measured with an ultra-microbalance with a mass resolution of ±0.1 μg. A controlled relative humidity was generated by mixing different proportions of dry and water saturated carrier gas streams. The temperature was maintained constant at 25.0±0.2° C., by enclosing the entire system in a temperature controlled incubator. A sample size between 5 and 20 mg was used. Prior to being exposed to any water vapor the sample was dried at 0% relative humidity (RH) to remove most surface water present and establish a dry, baseline mass. Next, the sample was exposed to an increasing relative humidity raised by steps of 5% RH, from 0 to 95% RH.

IV. High-Resolution X-Ray Powder Diffraction (HR-XRPD)

High-resolution diagrams were recorded at ambient conditions on a PANanalytical X'Pert Pro MPD powder diffractometer using Bragg-Brentano (vertical θ-2θ configuration) parafocusing geometry coupled with an X'Celerator detector. A sealed copper anode X-ray tube was used. An incident beam monochromator produced pure Cu K$\alpha$1 radiation ($\lambda$, =1.5406 Å). The angular range extended from few 2-Theta degrees to several dozen 2-Theta degrees with a 0.017° step size in 2θ.

Example 1: Preparation of Crystalline Anhydrate Form 2 of Compound of Formula (1) Via Recrystallization by Evaporation Protocol 1: Solutions of 10 mg/mL of amorphous compound of formula (1) (50 mg of solid amorphous in 5 mL of solvent, vial of 20 mL) were prepared at room temperature. The solution/suspension was left at selected temperature for almost complete evaporation (open 20 mL vial).

According to protocol 1, as a solvent was used separately methanol at about 20° C., 40° C. or 80° C. (each time ±2° C.), ethanol/H$_2$O (99/1) at about 20° C. (±2° C.), 2-butanone at about 20° C., 40° C. or 80° C. (each time ±2° C.), ethyl acetate at about 20° C., 40° C. or 80° C. (each time ±2° C.), or acetonitrile at about 20° C., 40° C. or 80° C. (each time ±2° C.).

Example 2: Preparation of Crystalline Anhydrate Form 2 of Compound of Formula (1) Via Recrystallization by Cooling Protocol 2: 100 mg/mL solutions/suspensions (depending on the solvent being used) of amorphous compound of formula (1) (100 mg of solid amorphous in 1 mL of solvent, vial of 4 mL) were prepared at room temperature. The solution/suspension was then heated to 80° C. The latter was heated again to 80° C. The solution was then cooled to room temperature, 5° C. or −20° C.

According to protocol 2, as a solvent was used separately acetone by using for the cooling step a temperature of about −20° C., 5° C. or 20° C. (each time ±2° C.) or methyl acetate by using for the cooling step a temperature of about 5° C. or 20° C. (each time ±2° C.).

Example 3: Preparation of Crystalline Anhydrate Form 2 of Compound of Formula (1) Via Recrystallization by Adding Water as a Non-Solvent Protocol 3: 50 mg/mL solutions/suspensions (depending on the solvent being used) of amorphous compound of formula (1) (50 mg of solid amorphous in 1 mL of solvent, vial of 4 mL) were prepared at room temperature. The latter was kept at room temperature for the addition of the non-solvent (here, water).

According to protocol 3, as a solvent was used separately MIBK at about 20° C. (±2° C.) or isobutyl acetate at about 20° C. (±2° C.).

Example 4: Preparation of Crystalline Anhydrate Form 2 of Compound of Formula (1) Via Recrystallization by Adding Heptane as a Non-Solvent Protocol 4: 200 mg/mL solutions/suspensions (depending on the solvent being used) of amorphous compound of formula (1) (50 mg of solid amorphous in 250 μL of solvent, vial of 4 mL) were prepared at room temperature. The latter was kept at room temperature for the addition of the non-solvent (here, heptane).

According to protocol 4, as a solvent was used separately 1-butanol at about 20° C. (±2° C.), acetone at about 20° C. (±2° C.) or isopropyl acetate at about 20° C. (±2° C.).

Characterization of Crystalline Anhydrate Form 2

The crystalline anhydrate Form 2 of compound of formula (1) was characterized by XRPD as substantially presented in FIG. 1, by DSC as substantially illustrated by FIG. 2, and DVS as substantially illustrated by FIG. 3.

Example 5: Preparation of Crystalline Anhydrate Form 2 of Compound of Formula (1) by Seeding Starting from 1 kg of 6-(2,4-dichlorophenyl)-5-(4-[1-(3-fluoro-propyl)-pyrrolidin-3-yloxy]-phenyl)-8,9-dihydro-7H-benzocycloheptene-2-carboxylic acid methyl ester oxalate salt as described in patent application WO 2020/049153, the free base is obtained by addition of aqueous potassium carbonate in MeTHF (also named 2-methyltetrahydrofuran). Then the free base in solution in MeTHF is saponified using NaOH in presence of MeOH, under conditions well known in the Art. After several washings in aqueous medium while maintaining pH in the range of 5.0 to 6.6, the organic phase (composed of MeTHF) is dehydrated by distillation under vacuum at a jacket temperature of 55° C. maximum. Seeds of anhydrate Form 2 of compound of formula (1) were introduced at 28° C.±3° C., in a volume ratio of 5V of reaction medium (MeTHF) to the starting material (oxalate salt described above), and the reaction medium was maintained at 28° C.±3° C. for at least an hour under stirring.

Then, the MeTHF solvent was exchanged with acetone, at constant volume, under vacuum, and at a temperature of 55° C. *maximum*. During this solvent exchange, the reaction medium became turbish, indicating that crystallisation was starting. Distillation was pursued until MeTHF content was equal or less than 2.0%.

The reaction medium was heated to 40° C.-45° C., the purified water was added in a ratio of 1.3V of purified water per kg of starting material (oxalate salt as described above). The reaction medium was cooled under stirring to 0° C.±3° C. during at least 4 hours. The anhydrate Form 2 of compound of formula (1) thus obtained was washed with acetone and water, filtered and then dried, yielding 0.77 kg of anhydrate Form 2 of compound of formula (1).

In another embodiment, this seeding process was also implemented on a dry amorphous form of compound of formula (1). This amorphous form was solubilized in 7.1V of MeTHF, heated to about 55° C. until complete dissolution. The medium was concentrated under vacuum at a jacket temperature of 55° C. *maximum*, and seeding was implemented as described above. Yield was greater than 95%.

Comparative Example 6: Crystalline Anhydrate Form 1 of Compound of Formula (1)

The crystalline anhydrate Form 1 of compound of formula (1) was obtained by desolvation of ethanol solvate.

Ethanol solvate form was obtained by slow evaporation of an ethanol solution at room temperature. Then, the thus obtained ethanol solvate was placed under vacuum at 40° C. And then, the crystalline anhydrate Form 1 was generated by the desolvation of ethanol solvate.

Figure 4:
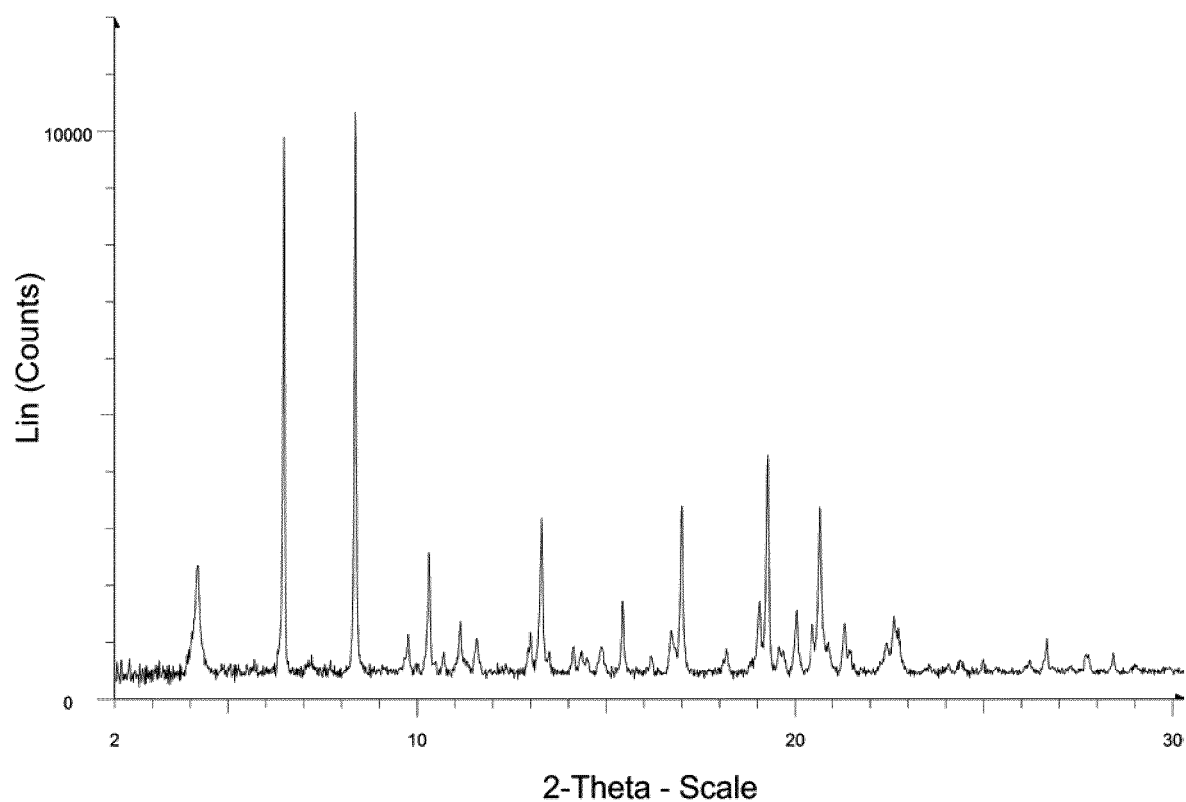
FIG. 4 is a X-ray powder diagram of the anhydrate crystalline Form 1 of 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid measured at room temperature.

The crystalline anhydrate Form 1 of compound of formula (1) was characterized by XRPD as substantially presented in FIG. 4, by DSC as substantially illustrated by FIG. 5, and DVS as substantially illustrated by FIG. 6.

Comparative Example 7: Crystalline Anhydrate Form 3 of Compound of Formula (1)

At room temperature, 40% by weight water was slowly added to a 50 mg/ml solution of compound of formula (1) in acetone. The crystals of anhydrous form 3 has appeared after more hours at room temperature.

Figure 7:
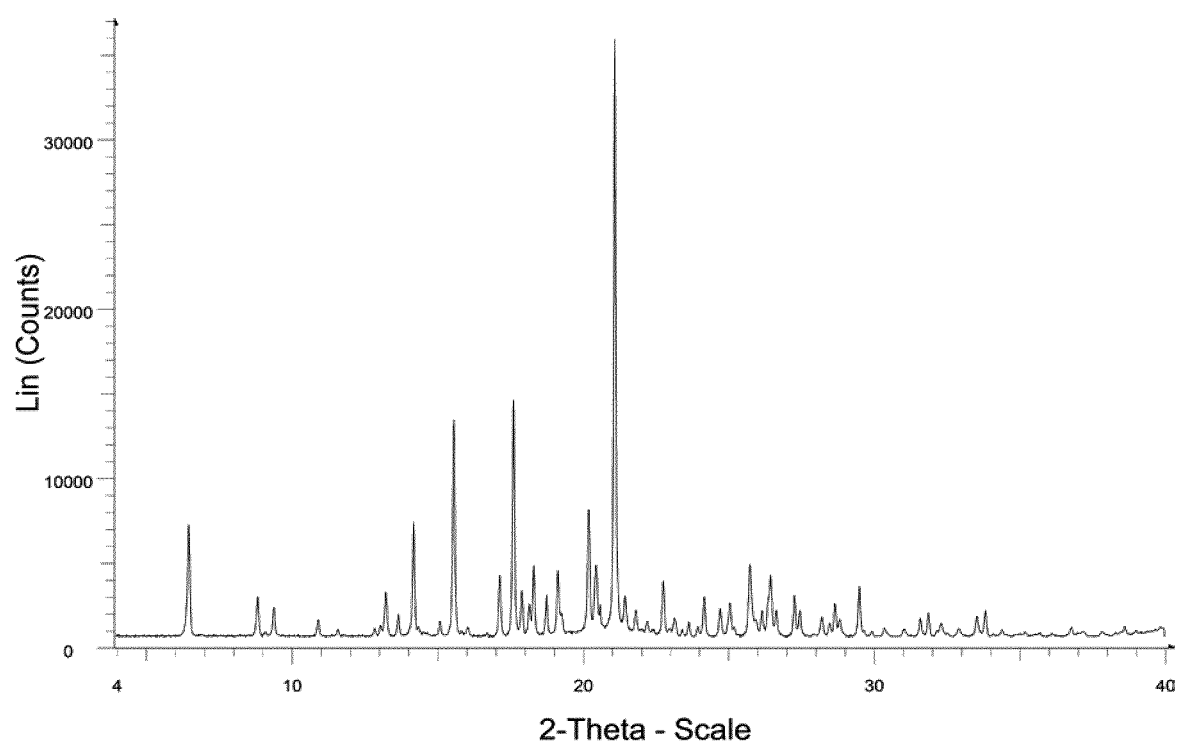
FIG. 7 is a X-ray powder diagram of the anhydrate crystalline Form 3 of 6-(2,4-dichlorophenyl)-5-[4-[(3S)-1-(3-fluoropropyl)pyrrolidin-3-yl]oxyphenyl]-8,9-dihydro-7H-benzo[7]annulene-2-carboxylic acid measured at room temperature.

The crystalline anhydrate Form 3 of compound of formula (1) was characterized by XRPD as substantially presented in FIG. 7, by DSC as substantially illustrated by FIG. 8, and DVS as substantially illustrated by FIG. 9.

Comparative Example 8: Crystalline Anhydrate Form 4 of Compound of Formula

The crystalline anhydrate Form 4 of compound of formula (1) was obtained by performing water sorption isotherms using dynamic vapor sorption (DVS) of the DCM solvate. After several hours under nitrogen flow (200 cm³ per minute) at 25° C., then 2 consecutive cycles of sorption/desorption of water at 25° C. from 0% to 95% relative humidity, the anhydrate Form 4 of compound of formula (1) was obtained.

Comparative Example 9: Ethanol Solvate of Compound of Formula (1)

Ethanol solvate was obtained by dissolution at 40° C. (50 mg/mL) in ethanol and cooling at about 20° C. (±2° C.). Ethanol solvate stoichiometry is 1 molecule of solvent per molecule of compound of formula (1).

XRPD diagrams of ethanol solvate are substantially presented in FIG. 13*a* and FIG. 13*b*.

Comparative Example 10: Acetone Solvate of Compound of Formula (1)

Acetone solvate was obtained by slow evaporation of a saturated solution at about 20° C. (±2° C.). Its stoichiometry is 1.5 molecule of solvent for 1 molecule of compound of formula (1).

XRPD diagrams of acetone solvate are substantially presented in FIG. 14*a* and FIG. 14*b*.

Comparative Example 11: Butanol Solvate of Compound of Formula (1)

Butanol solvate was obtained by cooling a 20 mg/mL solution to −20° C. The latter is an heterosolvate (1:2:1 water:butanol:compound of formula (1)).

XRPD diagrams of butanol solvate are substantially presented in FIG. 15*a* and FIG. 15*b*.

Comparative Example 12: DCM Solvate of Compound of Formula (1)

A solution of compound of formula (1) at 2.5 vol was prepared in DCM at room temperature. The solution was then slowly evaporated at 5° C.

XRPD diagram of DCM solvate is substantially presented in FIG. 16.

Comparative Example 13: THF Solvate of Compound of Formula (1)

A solution of compound of formula (1) at 400 mg/ml was prepared in THF at 40° C. Then, the solution was cooled at room temperature under magnetic stirring.

XRPD diagram of THF solvate is substantially presented in FIG. 17.

Comparative Example 14: 2-Propanol Solvate of Compound of Formula (1)

2-propanol solvate was obtained from evaporation of a mix solvent 2-propanol/water (99/1) at about 20° C. (±2° C.). 2-propanol solvate stoichiometry is 1 molecule of solvent per molecule of compound of formula (1).

XRPD diagram of the 2-propanol solvate is substantially presented in FIG. 18.

Comparative Example 15: MTBE Solvate of Compound of Formula (1)

MTBE solvate was obtained by slow release of water in a 50 mg/mL solution by vapor phase diffusion at about 20° C. (±2° C.).

XRPD diagram of the MTBE solvate is substantially presented in FIG. 19.

Comparative Example 16: 1,4-Dioxane Solvate of Compound of Formula (1)

1,4-dioxane solvate was obtained by cooling a 100 mg/mL solution to −20° C.

XRPD diagrams of the 1,4 dioxane solvate are substantially presented in FIG. 20a and FIG. 20b.

As explained above, the inventors have demonstrated that Form 2 of the compound of formula (1) is thermodynamically more stable compared to the hereabove various identified forms, under room temperature and ambient pressure.

Anhydrate form 2 further presents the advantage to be not hygroscopic and does not convert to another crystalline form after exposure to moisture. Moreover, exposure to temperature variations does not alter the crystal structure before its melting. It should be additionally noted that once anhydrate Form 2 has been obtained, it has been impossible to recrystallize the anhydrate Form 1 by adding seed crystals, hence showing the stability of anhydrate Form 2 crystals.

As far as the solvates are concerned, under ambient conditions of temperature and pressure, all solvates are unstable.

The invention claimed is:

1. An anhydrate crystalline form, which is Form 2 of compound of formula (1)

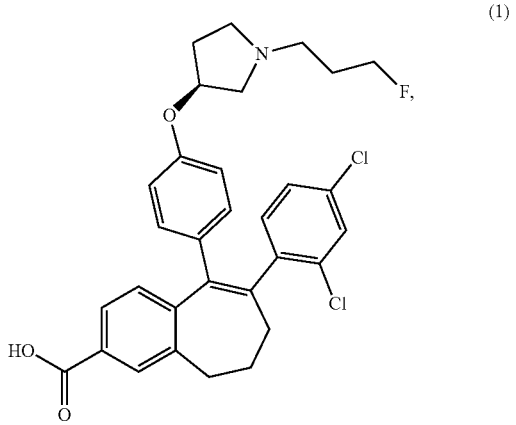

(1)

characterized by having a powder-X-ray diffractogram displaying peaks expressed as degree 2-Theta angles at about 9.5; 11.8; 14.1; 14.6; 17.7 and 18.5.

2. The anhydrate crystalline Form 2 of compound of formula (1) according to claim 1, which further shows the following peaks expressed as degree 2-Theta angles: at about 15.5; 15.9; 16.6 and 22.2.

3. The anhydrate crystalline Form 2 of compound of formula (1) according to claim 2, wherein a differential scanning calorimetry (DSC) shows a melting endotherm at about 204° C. onset.

4. The anhydrate crystalline Form 2 of compound of formula (1) according to claim 3, characterized by showing a weight gain of less than 0.2 weight % based on the weight of the crystalline Form 2 anhydrate, as determined by Dynamic Vapor Sorption (DVS) in the range of from 0% to 95% relative humidity at a temperature of about 25° C.

5. A process for the preparation of the anhydrate crystalline Form 2 of compound of formula (1) according to claim 1, comprising at least the following steps:

1) solubilizing the compound of formula (1) in amorphous form in a solvent selected from alcohols, ketones, acetates, ethers and acetonitrile, optionally in admixture with water, at a set temperature ranging from 18° C. to 80° C.;

2) leaving the solution obtained in step 1) at the same temperature as the one set in step 1) for almost complete evaporation; and 3) isolating the anhydrate crystalline Form 2 of compound of formula (1) formed in step 2).

6. The process according to claim 5, wherein the solvent is selected from methanol, methanol/water mixture, ethanol, ethanol/water mixture, 2-propanol, 1-propanol, 1-propanol/water mixture, 1-butanol, 1-butanol/water mixture, acetone, acetone/water mixture, 2-butanone, 2-butanone/water mixture, methyl isobutyl ketone, methyl isobutyl ketone/water mixture, methyl acetate, methyl acetate/water mixture, ethyl acetate, ethyl acetate/water mixture, isopropyl acetate, isopropyl acetate/water mixture, isobutyl acetate, isobutyl acetate/water mixture, acetonitrile, and methyl tert-butyl ether.

7. The process according to claim 5, wherein the set temperature of step 1) and step 2) is selected from a range of temperature from 20° C. to 80° C.

8. A process for the preparation of the anhydrate crystalline Form 2 of compound of formula (1) according to claim 1, comprising at least the following steps:

1) solubilizing or suspending the compound of formula (1) in amorphous form in a solvent selected from alcohols, ketones, acetates, ethers and acetonitrile, at room temperature;

2) optionally purifying the solution or suspension obtained in step 1) by heating at a set temperature ranging from 60° C. to 80° C., stirring and filtering the solution or suspension;

3) heating the solution or suspension obtained in step 1) or in step 2) at a set temperature ranging from 60° C. to 80° C.;

4) cooling the solution or suspension obtained in step 2) to a set temperature ranging from −20° C. to 25° C.; and 5) isolating the anhydrate crystalline Form 2 of compound of formula (1) formed in step 4).

9. The process according to claim 8, wherein the solvent is selected from ethanol, 2-propanol, 1-propanol, 1-butanol, acetone, 2-butanone, methyl isobutyl ketone, isopentyl methyl ketone, methyl acetate, ethyl acetate, isopropyl acetate, isobutyl acetate, acetonitrile, and methyl tert-butyl ether.

10. A process for the preparation of the anhydrate crystalline Form 2 of compound of formula (1) according to claim 1, comprising at least the following steps:

1) solubilizing or suspending the compound of formula (1) in amorphous form in a solvent selected from alcohols, ketones, acetates, and diethyl-ether, at room temperature;

2) optionally filtering the solution or suspension obtained in step 1);

3) adding water as a non-solvent; and 4) isolating the anhydrate crystalline Form 2 of compound of formula (1) formed in step 3).

11. The process according to claim 10, wherein the solvent is selected from 2-propanol, 1-propanol, 1-butanol, acetone, 2-butanone, methyl isobutyl ketone, isopentyl methyl ketone, methyl acetate, ethyl acetate, isopropyl acetate, isobutyl acetate, and diethyl ether.

12. A process for the preparation of the anhydrate crystalline Form 2 of compound of formula (1) according to claim 1, comprising at least the following steps:
1) solubilizing or suspending the compound of formula (1) in amorphous form in a solvent selected from alcohols, ketones, and acetates, at a set temperature which is room temperature;
2) optionally filtering the solution or suspension obtained in step 1);
3) adding heptane as a non-solvent; and
4) isolating the anhydrate crystalline Form 2 of compound of formula (1) formed in step 3).

13. The process according to claim 12, wherein the solvent is selected from ethanol, 2-propanol, 1-propanol, 1-butanol, acetone, 2-butanone, methyl isobutyl ketone, isopentyl methyl ketone, methyl acetate, ethyl acetate, isopropyl acetate, and isobutyl acetate.

14. A process for the preparation of the anhydrate crystalline Form 2 of compound of formula (1) according to claim 1, comprising at least the following steps:
1) solubilizing or suspending the compound of formula (1) in amorphous form in an organic solvent; and
2) adding seeds of anhydrate crystalline Form 2 of the compound of formula (1).

15. The process according to claim 14, wherein steps 1) and 2) are followed by the step of adding a non-solvent, then performing distillation, followed by cooling and drying.

16. A medicament, characterized in that it comprises the anhydrate crystalline Form 2 of compound of formula (1) according to claim 1.

17. A pharmaceutical composition comprising the anhydrate crystalline Form 2 of compound of formula (1) according to claim 1, and at least one pharmaceutically acceptable excipient.

18. The pharmaceutical composition according to claim 17, wherein said anhydrate crystalline Form 2 is substantially pure and substantially free of alternative forms.

19. The pharmaceutical composition according to claim 17, wherein said anhydrate crystalline Form 2 is at least 90 percent by weight of all forms.

20. A method of treating cancer comprising administering to a subject in need thereof a pharmaceutically effective amount of anhydrate crystalline Form 2 of compound of formula (1) according to claim 1.

21. The process according to claim 5, wherein the set temperature of step 1) and step 2) is selected from a range of temperature from 25° C. to 80° C.

* * * * *